US012759391B2

(12) United States Patent
Mohapatra et al.

(10) Patent No.: US 12,759,391 B2
(45) Date of Patent: Oct. 13, 2026

(54) VENT VALVE ASSEMBLY

(71) Applicant: Eaton Intelligent Power Limited, Dublin (IE)

(72) Inventors: Chandan Mohapatra, Pune (IN); Mayur Pote, Pune (IN); Daniel Lee Pifer, Chelsea, MI (US); James Ostrosky, Brighton, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 19/070,382

(22) Filed: Mar. 4, 2025

(65) Prior Publication Data

US 2025/0196621 A1 Jun. 19, 2025

Related U.S. Application Data

(63) Continuation of application No. PCT/EP2023/025405, filed on Sep. 22, 2023.

(30) Foreign Application Priority Data

Sep. 22, 2022 (IN) ............................ 202211054223

(51) Int. Cl.

*B60K 15/035* (2006.01)
*B60K 15/03* (2006.01)
*F16K 24/04* (2006.01)

(52) U.S. Cl.

CPC ...... *B60K 15/03519* (2013.01); *F16K 24/042* (2013.01); *B60K 2015/03289* (2013.01); *F16K 24/044* (2013.01); *Y10T 137/3099* (2015.04)

(58) Field of Classification Search

CPC ........ B60K 15/03519; B60K 15/30289; F16K 24/044; Y10T 137/3099

See application file for complete search history.

(56) References Cited

U.S. PATENT DOCUMENTS 5,605,175 A 2/1997 Bergsma
5,638,856 A 6/1997 Ohsaki (Continued)

FOREIGN PATENT DOCUMENTS

CN 2799995 Y 7/2006
CN 210014077 U 2/2020

(Continued)

OTHER PUBLICATIONS

Sep. 8, 2022 for International Application No. PCT/EP2021/025436, 15 pages.

(Continued)

*Primary Examiner* — Robert K Arundale

(74) *Attorney, Agent, or Firm* — Stinson LLP

(57) ABSTRACT

A vent valve assembly for use with a fuel tank may comprise a housing having outer and inner wall structures that define a chamber therebetween, and a float located inside the chamber and configured to be translatable relative to the housing along an axis. The float has an orifice extending along the axis. The inner wall structure of the housing is disposed within the orifice of the float, facing an inner surface of the orifice. The vent valve assembly also comprises one or more guiding features located on the inner surface of the orifice, and one or more mating guiding features located on the inner wall structure of the housing and configured to mate with the guiding features. The guiding features and mating guiding features cooperate to guide translation of the float relative to the housing along the axis and restrict rotation of the float about the axis.

20 Claims, 18 Drawing Sheets

(56) References Cited

U.S. PATENT DOCUMENTS

| | | | | |
|---|---|---|---|---|
| 5,738,132 | A | 4/1998 | Zakai | |
| 5,950,659 | A | 9/1999 | Szlaga | |
| 5,957,150 | A | 9/1999 | Perkins | |
| 6,145,533 | A | 11/2000 | Perkins | |
| 6,276,390 | B1 | 8/2001 | Perkins | |
| 6,371,152 | B1 | 4/2002 | Benjey | |
| 6,779,544 | B2 | 8/2004 | Devall | |
| 6,848,463 | B2 | 2/2005 | Johansen | |
| 6,863,082 | B1 | 3/2005 | Mcintosh | |
| 7,614,417 | B2 | 11/2009 | Simon | |
| 8,100,153 | B2 * | 1/2012 | Hirata | F16K 31/22 141/95 |
| 8,230,873 | B2 | 7/2012 | Martin | |
| 8,490,642 | B2 | 7/2013 | Muto | |
| 9,393,862 | B2 | 7/2016 | Vulkan | |
| 9,574,675 | B2 | 2/2017 | Schindler | |
| 11,001,138 | B2 | 5/2021 | Kim | |
| 11,059,368 | B2 | 7/2021 | Mensch | |
| 11,155,159 | B2 | 10/2021 | Okabayashi | |
| 11,733,718 | B2 | 8/2023 | Mihara | |
| 2005/0126633 | A1 | 6/2005 | Leonhardt | |
| 2008/0276994 | A1 * | 11/2008 | Goetzinger | F16K 31/24 137/218 |
| 2010/0282335 | A1 | 11/2010 | Mills | |
| 2015/0107689 | A1 | 4/2015 | Walkowski | |
| 2017/0158047 | A1 | 6/2017 | Walkowski | |
| 2019/0255938 | A1 | 8/2019 | Mensch | |
| 2020/0101836 | A1 * | 4/2020 | Iiduka | B60K 15/03519 |
| 2023/0417336 | A1 | 12/2023 | Kankaria | |
| 2024/0424889 | A1 * | 12/2024 | Mihara | F16K 31/20 |

FOREIGN PATENT DOCUMENTS

| | | | |
|---|---|---|---|
| EP | 2872348 | B1 | 1/2020 |
| JP | 2011131710 | A | 7/2011 |
| KR | 101075793 | B1 | 10/2011 |
| WO | WO 2012127918 | A1 | 9/2012 |
| WO | WO 2018085325 | A1 | 5/2018 |
| WO | WO 2020144089 | A1 | 7/2020 |
| WO | WO 2021256368 | A1 | 12/2021 |
| WO | WO 2024153465 | A1 | 7/2024 |
| WO | WO 2024189604 | A2 | 9/2024 |
| WO | WO 2025003998 | A1 | 1/2025 |

OTHER PUBLICATIONS

International Search Report and Written Opinion mailed on Feb. 29, 2022 for International Application No. PCT/EP2023/025405, 11 pages.

* cited by examiner

VENT VALVE ASSEMBLY

CROSS REFERENCE TO RELATED APPLICATION

This application is a continuation under 35 U.S.C. § 365(c) of International Patent Application No. PCT/EP2023/025405, filed on 22 Sep. 2023, which claims the benefit under 35 U.S.C. § 119 of Indian Application No. 202211054223, filed on 22 Sep. 2022, all of which are incorporated by reference herein in their entirety.

TECHNICAL FIELD

This disclosure generally relates to fuel storage systems, and more particularly to vent valve assemblies for use with fuel tanks of vehicles.

BACKGROUND

Fuel tanks of vehicles often utilize safety systems to provide for safe, consistent operation under a range of conditions. Typically, the safety system may open fluid communication between the fuel tank and other components of a fuel system to allow pressurized fuel vapor to escape the fuel tank under normal conditions, and close fluid communication between the fuel tank and the other components of the fuel system to prevent liquid fuel from flowing out of the fuel tank, for example, during over-filling of liquid fuel, when the vehicle is located on inclined surfaces, or when there is aggressive vehicle and/or fuel motion, etc. Reliable performance of these safety systems is particularly crucial in view of the high flammability and high energy density of the fuel.

SUMMARY OF PARTICULAR EMBODIMENTS

This disclosure presents a vent valve assembly having various components that enable safe venting of fuel vapors while preventing unintentional leakage of liquid fuel. Features are further disclosed for enabling the system to perform appropriately under a range of operating conditions, such as over-filling, vehicle location on inclined surfaces, and/or significant vehicle and fuel motion, etc. Moreover, in addition to providing vapor venting and liquid leakage protection, the vent valve assembly of this disclosure may provide added benefits in terms of manufacturing, such as low production cost, efficient packaging, small system footprint, and so on.

In one embodiment, a vent valve assembly for use with a fuel tank is provided, which comprises a housing having an outer wall structure and an inner wall structure that together define a chamber therebetween, and a float located inside the chamber and configured to be translatable relative to the housing along an axis. In particular, the float has an orifice extending along the axis. The inner wall structure of the housing is disposed within the orifice of the float. An inner surface of the orifice of the float is positioned to face the inner wall structure of the housing. The vent valve assembly also comprises one or more guiding features located on the inner surface of the orifice of the float, and one or more mating guiding features located on the inner wall structure of the housing and configured to mate with the one or more guiding features. In particular, the one or more guiding features and the one or more mating guiding features cooperate to guide translation of the float relative to the housing along the axis and restrict rotation of the float about the axis.

In particular embodiments, the one or more guiding features extend substantially throughout the length of the float along the axis.

In particular embodiments, the length of the one or more guiding features is substantially equal to the length of the one or more mating guiding features.

In particular embodiments, the one or more guiding features are configured as guide channels. In particular embodiments, the one or more mating guiding features are configured as guides that are inserted into the guide channels.

In particular embodiments, the one or more guiding features are uniformly distributed in a radial direction on the inner surface of the float.

In particular embodiments, the one or more mating guiding features are uniformly distributed in a radial direction on the inner wall of the housing.

In particular embodiments, the one or more mating guiding features include a nob.

In particular embodiments, four guiding features and four mating guiding features are provided.

In particular embodiments, the vent valve assembly further comprises one or more additional guiding features located on an outer surface of the float, and one or more additional mating guiding features located on the outer wall of the housing and configured to mate with the one or more additional guiding features.

In one embodiment, a vent valve assembly comprises a housing having an outer wall structure, an inner wall structure, and a valve orifice. In particular, the outer wall structure and the inner wall structure define a chamber therebetween. The vent valve assembly also comprises a float located inside the chamber and configured to be translatable relative to the housing along an axis, a flapper disposed at an upper surface of the float and positioned in alignment with the valve orifice, and a flapper guide located at the upper surface and configured to engage with the flapper. In particular, the flapper guide allows opening and closing of flapper and keeps the flapper in alignment with the valve orifice.

In particular embodiments, the flapper guide is a hinge having two ends respectively connected to the upper surface of the float.

In particular embodiments, the flapper guide is a hinge having one end connected to the upper surface of the float and another end free from connection to the upper surface of the float.

In particular embodiments, the flapper guide comprises a channel. In particular embodiments, the flapper includes one or more posts, which are inserted into the channel of the flapper guide in a rotatable manner.

In particular embodiments, the flapper guide comprises a stopper configured to limit the degree of opening of the flapper.

In particular embodiments, the flapper guide is a rib.

In particular embodiments, the flapper guide comprises a base having a large cross-sectional area so as to restrict lateral movement of the flapper. In particular embodiments, the cross-sectional area of the base is shaped as a tetragon.

In particular embodiments, the flapper comprises one or more connector ends.

BRIEF DESCRIPTION OF THE DRAWINGS

Embodiments in accordance with this disclosure will now be described by reference to the accompanying drawings, in which.

DESCRIPTION OF EXAMPLE EMBODIMENTS

Reference will now be made in detail to the examples which are illustrated in the accompanying drawings. Wherever possible, the same reference numbers will be used throughout the drawings to refer to the same or like parts. Directional references such as "up", "down", "right", and "left" are for ease of reference to the figures and not intended to limit the scope of this disclosure.

The embodiments disclosed herein present an enhanced structure that may enable and improve performance relating to safe venting of fuel vapors and sealing against leakage of liquid fuel, for example, from fuel tanks of vehicles. Reliable performance of the safety systems is particularly critical in view of the high flammability and high energy density of the fuel. For instance, safety systems are needed to ensure that vapors released by the liquid fuel stored within the tank are safely released, rather than allowed to build up pressure within the fuel tank. For instance, a rise in ambient temperature and/or strong solar radiation may raise the temperature of the fuel tank and its contents, increasing the rate of forming fuel vapors. As another example, if a device or feature for safely allowing vapors of liquid fuels to be released from the tank is provided, further safety features are needed to ensure that the vapor release path does not function as a liquid fuel release path, i.e., to prevent unintentional leakage. For instance, if a tank is over-filled during refueling, liquid fuel level may leak through a passage that is intended for release of fuel vapors, unless the risk is anticipated and mitigated. As a further example, if the fuel vapor release passage is sealed against leakage based on an over-filling event, the design of the above-mentioned safety features needs to ensure that full functionality of safety systems (such as fuel vapor release) is promptly restored when the fuel level subsequently decreases below over-full. As yet another example, design aspects are required that ensure retention of safety feature performance under external forces or perturbations, such as when the vehicle is located (parked or traveling) on an inclined surface, and/or under significant vehicle motion such as hard acceleration, braking, or cornering.

Figure 1:
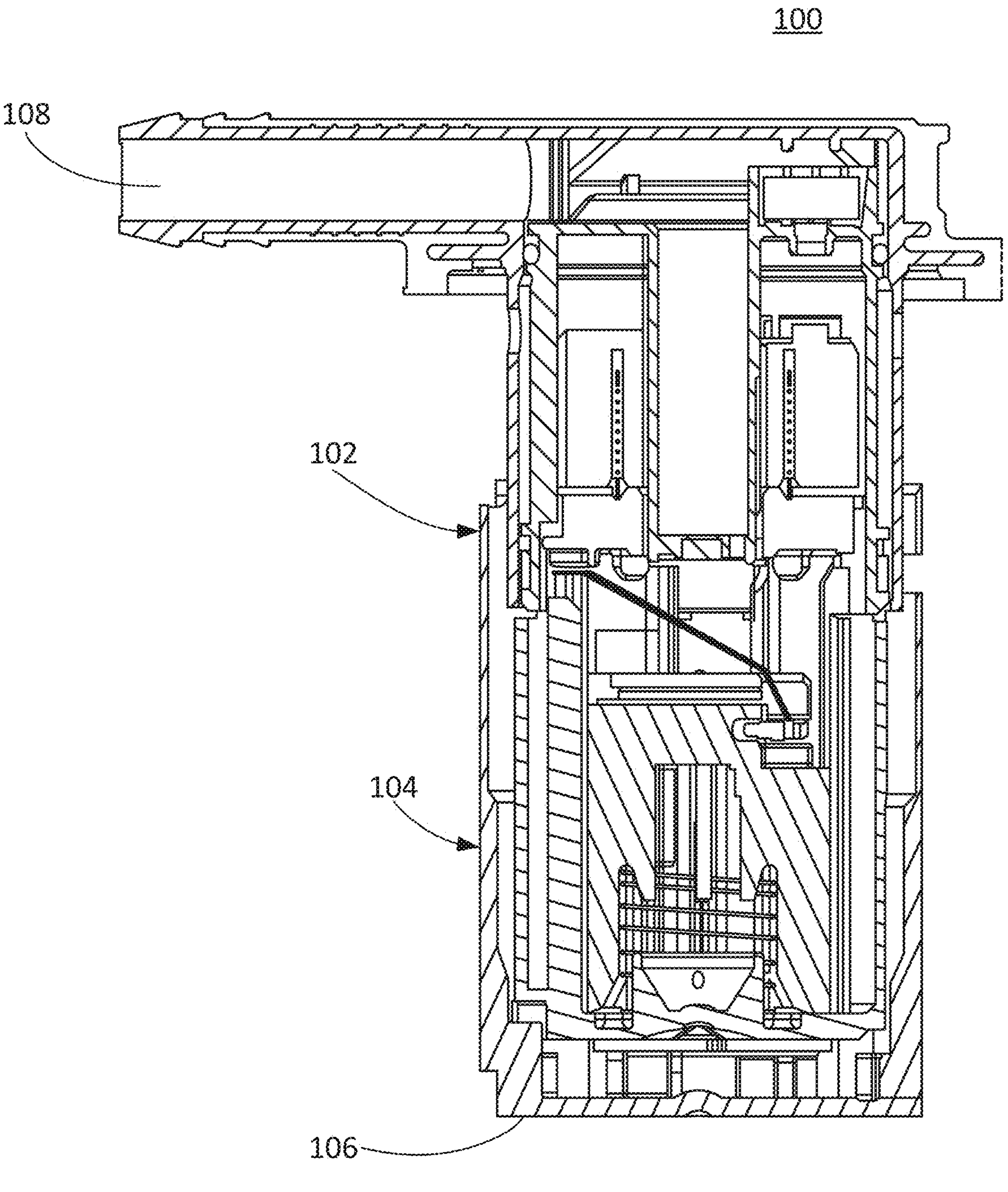
FIG. 1 depicts a schematic cross-sectional side view of an example embodiment of a Compact Combo Valve (CVV) assembly.

FIG. 1 shows a cross-sectional side view of an embodiment of a Compact Combo Valve (CCV) assembly 100, in a fully assembled configuration. In particular embodiments, the CCV assembly 100 may comprise a Grade Vent Valve (GVV) 102 and a Fill Limit Valve (FLV) 104. As an example and not by way of limitation, the GVV 102 and FLV 104 may be arranged in a stacked configuration as depicted, forming the CCV assembly 100 with small footprint, reducing potential permeation, although other suitable configurations are also envisioned by this disclosure. In particular embodiments, a base 106 of the CCV assembly 100 may connect to a fuel tank of a vehicle, for example, to a top surface of the fuel tank, and allow fluid communication of the contents (e.g., fuel) of the fuel tank with the CCV assembly 100. An outlet port 108 located at the top of the CCV assembly 100 may be configured as an outlet conduit for fuel vapors released by the fuel tank. Because the CCV assembly 100 is positioned at the very top of the fuel tank, it may prevent liquid leakage during various situations, such as when the vehicle is traveling or parked on an angle, when the vehicle is experiencing aggressive driving dynamics, etc.

While specific configurations and details of this disclosure are set forth in the context of a CCV in order to provide a thorough understanding of the embodiments, it will be apparent to one skilled in the art that the embodiments of this disclosure may be practiced in any other suitable vent valves or fuel tank components where fluid leakage needs to be prevented.

Figure 2:
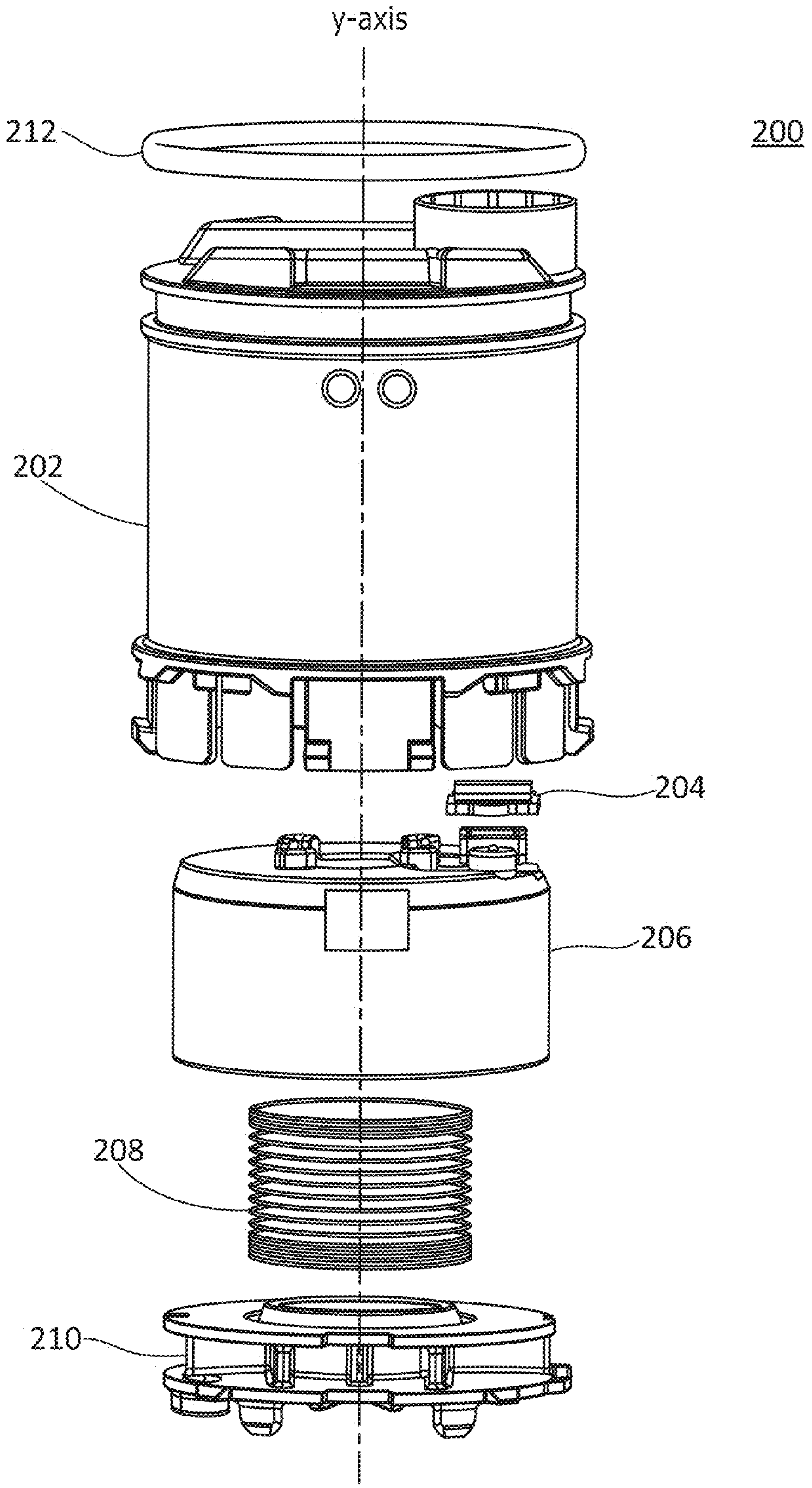
FIG. 2 depicts an exploded side perspective view of an example embodiment of a Grade Vent Valve (GVV), which may generally include a housing, a flapper, and a float.

FIG. 2 shows an exploded view of an embodiment of a GVV 200, which may generally include a housing 202, a flapper 204, and a float 206. In particular embodiments, the housing 202 may contain the float 206 in a way that allows the float 206 to translate (e.g., along a centerline or y-axis as shown) relative to the housing 202 in response to liquid fuel level. For example, under normal operating conditions, the float 206 may usually remain at a lower position inside the housing 202. However, if the vehicle is disposed at an extreme angle, for example, causing liquid fuel to enter the housing 202 (e.g., via an end cap 210 provided near the bottom of the housing 202), then buoyancy of the float 206 caused by any liquid fluid within the housing 202 may raise the float 206 to a raised position. In particular embodiments, the housing 202 and the float 206 may be made with suitable materials so that the interface between the housing 202 and the float 206 has desired properties of low friction, e.g., to facilitate translation of the float 206.

While the y-axis of the GVV 200 may be substantially vertical for a vehicle located on a horizontal surface, the y-axis does not necessarily coincide with the vertical vector (e.g., relative to the gravity vector) when the vehicle is located on an inclined surface. In the latter situation, the float 206 may remain constrained within the housing 202 and guided by float guides (details of which will be more thoroughly explained below) to translate along the y-axis of the GVV 200 based on the y-direction component of the buoyant forces acting on it.

In particular embodiments, the flapper 204 may be located on top of the float 206, e.g., on the upper surface of the float 206. As an example and not by way of limitation, retaining mechanisms may be provided on the float 206 in order to engage with the flapper 204. In particular embodiment, the flapper 204 may be moveable relative to the float 206. For example, the flapper 204 may open and/or close to enable and/or disable a fluid passage through the float 206. In doing so, hydraulic pressure may be equalized across the float 206 (i.e., above and below the float 206). Furthermore, in particular embodiments, the flapper 204 may be configured as a seal so as to close off an opening located at the housing 202 when the float 206 translates to its raised position (e.g., uppermost position available inside the housing 202.) This may be useful for example in an over-fill situation where liquid fuel needs to be prevented from escaping through the opening of the housing 202. This will be explained in greater detail below.

In particular embodiments, a biasing element 208 such as a coil spring may be provided, which may be coupled to the float 206 and configured to bias the float 206 into the raised position. As a non-limiting example, one end of the biasing element 208 may be supported by the end cap 210 whereas the other end of the biasing element 208 may push against the float 206. While the biasing force provided by the biasing element 208 may not necessarily be great enough to lift the float 206 alone, the biasing element 208 may cooperate with the buoyancy force produced by any liquid entering the housing 202 to move the float 206 into the raised position.

Although the above-described embodiments are set forth by referencing a GVV having particular components in a particular manner, this disclosure contemplates configuring the GVV with any suitable components in any suitable manner as will be appreciated by one of skill in the art. As an example and not by way of limitation, in some embodiments, the GVV 200 may further include an O-ring 212, which may be positioned around the top of the housing 202 for retention and/or leakage resistance. Other suitable features may also be provided but will not be described in detail to avoid obscuring the scope of this disclosure.

Figure 3:
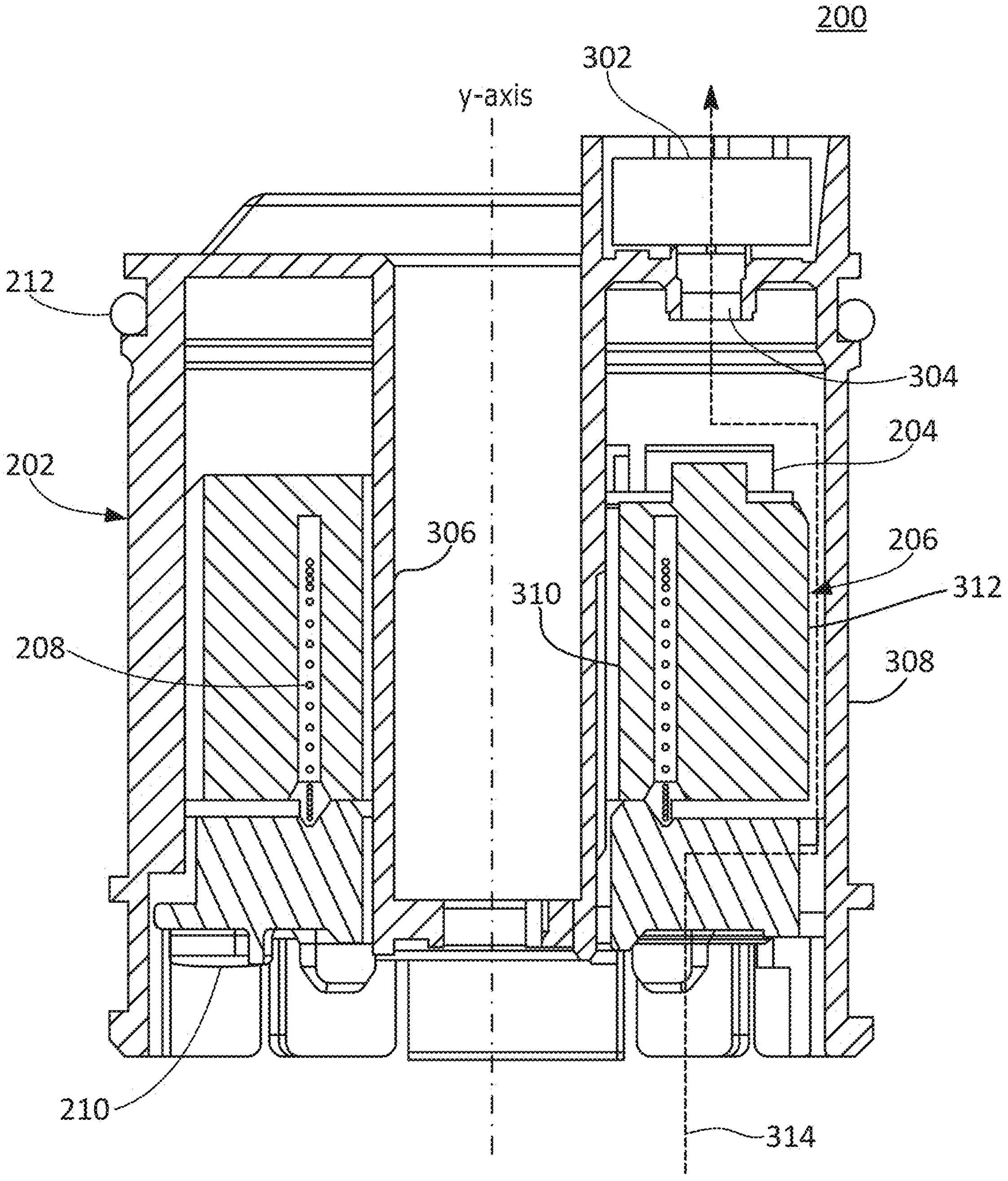
FIG. 3 depicts a cross-sectional side view of the GVV.

FIG. 3 shows a cross-sectional view of the GVV 200 according to this disclosure. In particular embodiments, the housing 202 may include an inner wall 306 and an outer wall 308, which together may form a chamber therebetween. In particular embodiments, the float 206 may be contained inside the chamber of the housing 202, e.g., in a movable manner, with an inner surface 310 of the float 206 facing the inner wall 306 and an outer surface 312 of the float 206 facing the outer wall 308. As an example and not by way of limitation, the float 206 may have an orifice extending along the y-axis. The inner wall 306 of the housing 202 may be disposed within the orifice in such a way that the inner surface 310 of the orifice may be positioned to face the inner wall 306 of the housing 202. In particular embodiments, the float 206 and the housing 202 may form an example approximate path (which is indicated by a dashed arrow 314) for release of fuel vapors, for example, from a fuel tank, through the GVV 200. For instance, while the position of the float 206 along the y-axis is determined by the liquid fuel level in the fuel tank, as discussed above, a small clearance may exist between the float 206 and the housing 202, specifically at an interface between the outer surface of the float 206 and the outer wall 308 of the housing 202. Fuel vapors from the fuel tank may, for instance, flow through the end cap 210 into the housing 202, around the float 206 through this small clearance, and occupy the volume above the float 206 within the housing 202. In particular embodiments, a valve mechanism, such as a disk-type head valve (disk valve 302 hereinafter), may be located on an orifice 304 near the top of the housing 202 and may be designed and calibrated to open at a predetermined pressure level and release the fuel vapor buildup through the orifice 304. For example, the disk valve 302 may be designed to open at vapor pressures exceeding 5 kPa or other suitable pressure levels and prevent pressure buildup beyond the designed opening pressure. It will be appreciated that while the embodiment is described as having a disk valve, other suitable types of valves as familiar to one of skill in the art may be employed for performing the desired function of this disclosure.

In particular embodiments, the orifice 304 communicating with the disk valve 302 may be positioned parallel with yet offset from the y-axis of the housing 202. This can be more clearly observed in FIG. 4, which depicts different cross-sectional views of the housing 202, i.e., one from the above and one from the side, with the disk valve 302 omitted for clarity. In the top view as shown, the y-axis runs through the center of the housing 202 and points into and/or out from the page, while the orifice 304 is located radially outward from the y-axis. As seen from the side view, which is the lower illustration of FIG. 4, in particular embodiments, the orifice 304 (as well as the disk valve 302) may be positioned in accurate alignment with the flapper 204, e.g., along an axis 402 that runs parallel with the y-axis. This may assist proper sealing of the orifice 304 when the float 206 translates to its raised position, thus avoiding undesired liquid leakage, as will be discussed below.

Figure 4:
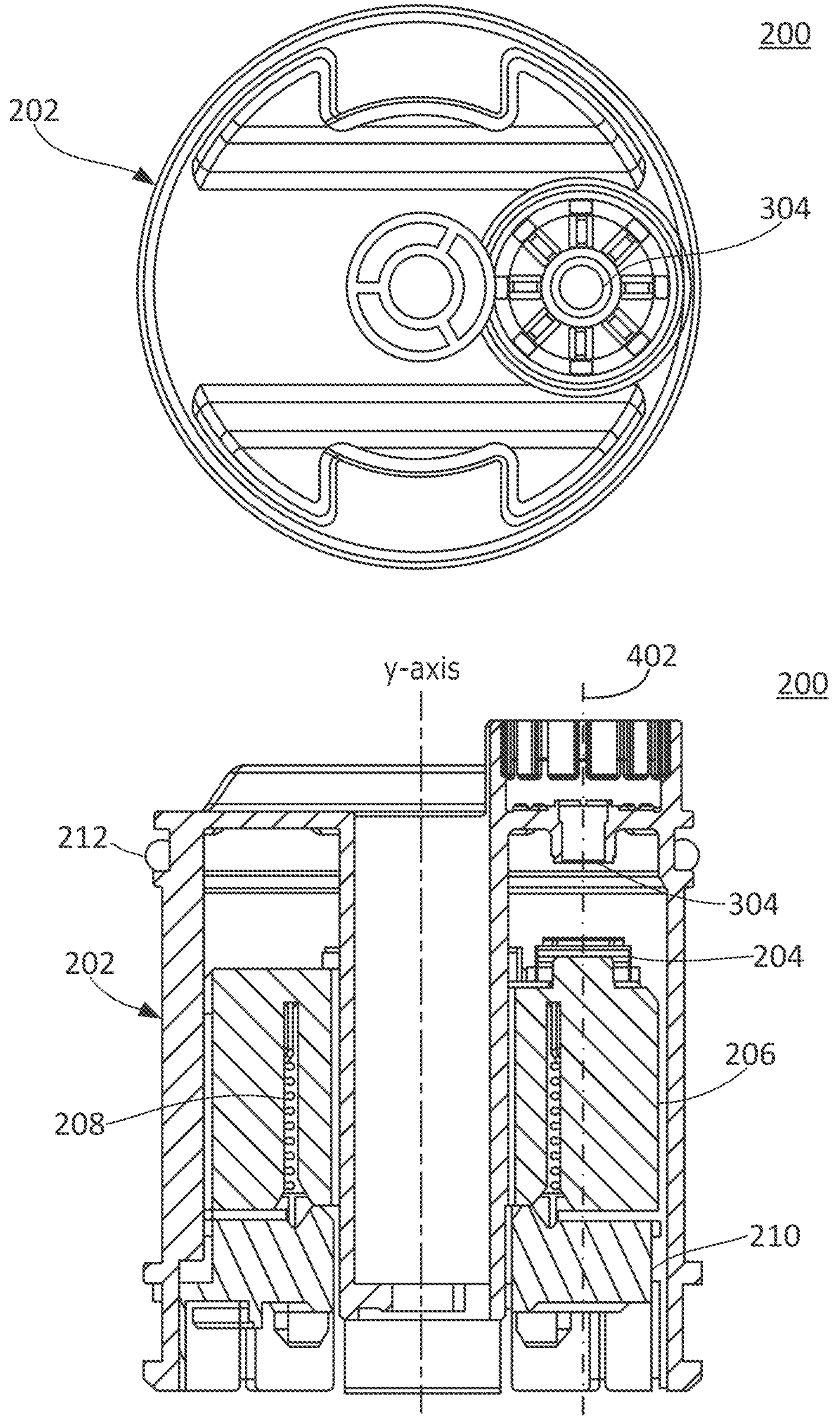
FIG. 4 depicts a top view and a cross-sectional side view of the GVV, with particular components omitted for better observation.

With continued reference to FIG. 4 and referring back to FIGS. 2 and 3, in particular embodiments, the flapper 204 may be disposed at the upper surface of the float 206. One purpose of the flapper 204 is to close the fuel vapor release passage through the orifice 304 and consequently the disk valve 302 when the liquid fuel level has risen past a specific level, for instance, in an over-filling situation if an attempt is made to fill the fuel tank beyond its rated capacity. The closing of the release passage may help prevent possible leakage of liquid fuel past the disk valve 302 through the vapor release passage via the orifice 304. At a particular high level of liquid fuel, such as during over-filling of the fuel, the float 206 may rise within the housing 202 responsive to the level of liquid fuel to a position where the upper surface of the flapper 204 (sometimes also referred to as a “ribbon surface”) may be pressed against the lower surface of the orifice 304. In this position, the flapper 204 may close off the orifice 304, e.g., in a fluid-tight manner, thus preventing any fuel from escaping out of the orifice 304.

Figure 5:
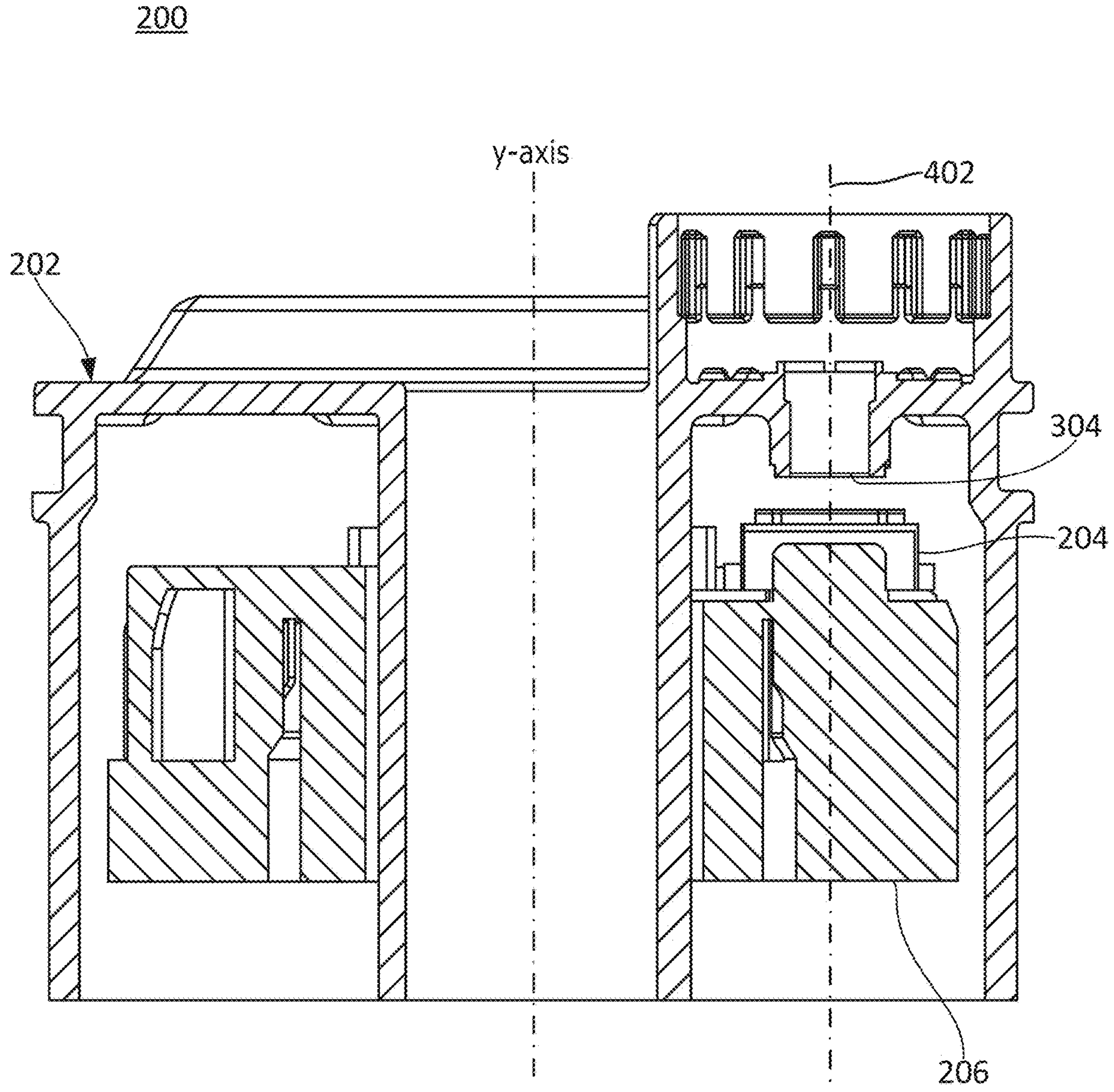
FIG. 5 depicts an enlarged cross-sectional side view of the GVV, with the float in a raised position.
Figure 6:
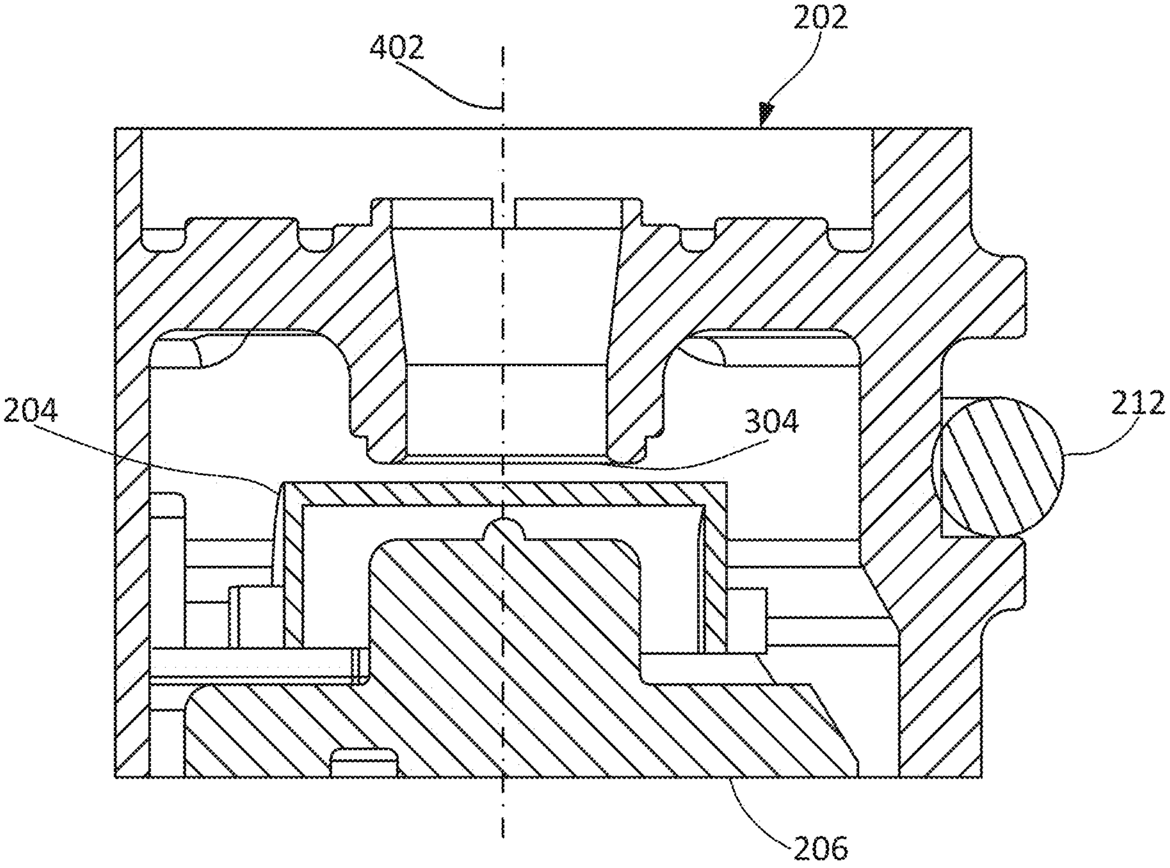
FIG. 6 depicts a close-up view of the GVV in FIG. 5, specifically showing the flapper.

FIGS. 5-6 show the float 206 and flapper 204 assembly at nearly the uppermost extent of travel available to the float 206, with the ribbon surface 602 about to engage with the orifice 304 based on an incremental further upward translation of the float 206, thereby sealing the orifice 304 closed. In particular embodiments, in order to provide for better sealing, the flapper 204 or more specifically the ribbon surface 602 of the flapper 204 may be made of flexible and/or deformable material such as elastomer or the like. Configured as such, as the float 206 rises to its uppermost position, the ribbon surface 602 may further compress and form a seal around the entrance of the orifice 304, thus enhancing leakage protection.

Additionally or alternatively, the flapper 204 may be designed to promptly restore the functionality of the vapor release passage through the disk valve 302 when the liquid fuel level drops back below its former maximum level, for instance by opening the flapper 204 in order to equalize the fluid pressure across (i.e., above and below) the upper surface of the float 206, as will be discussed in the following.

Figure 7:
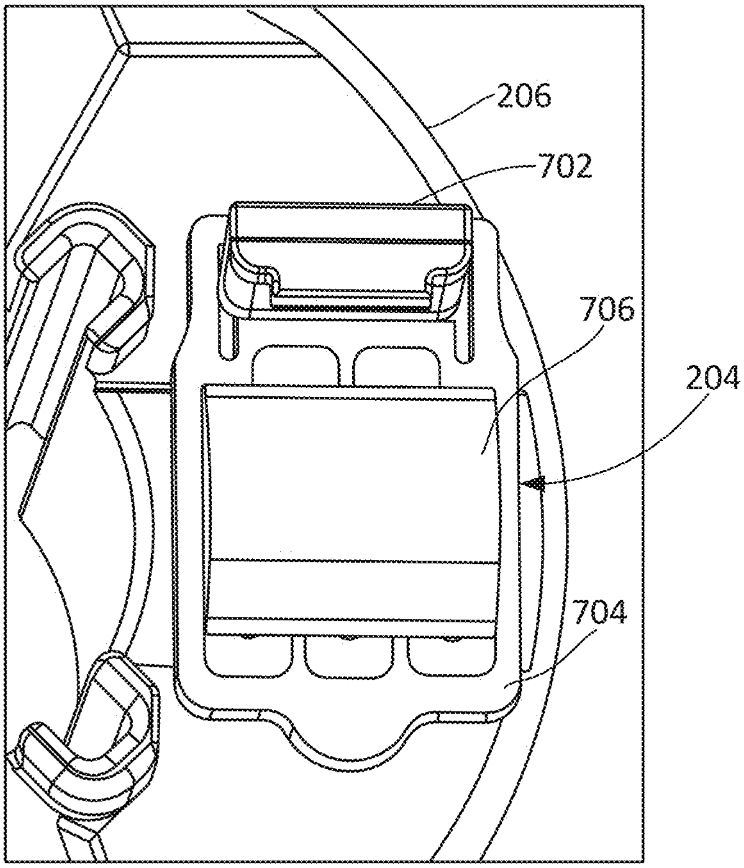
FIG. 7 depicts an embodiment of the flapper from the above.
Figure 8:
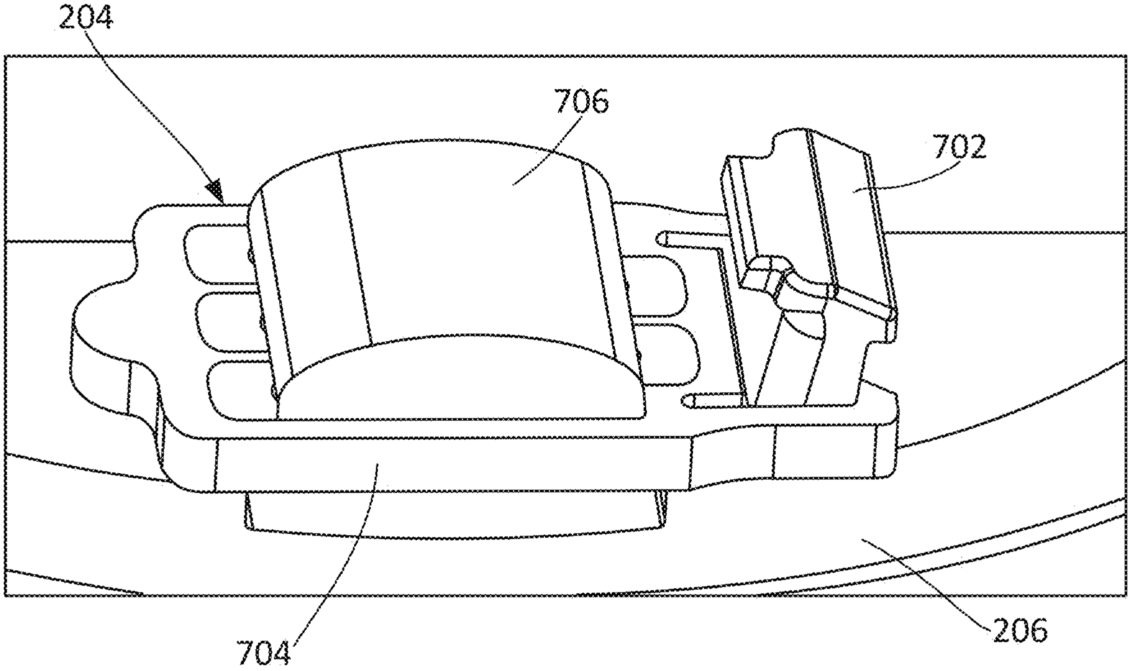
FIG. 8 depicts the flapper of FIG. 7 from the side.

FIGS. 7-8 show the flapper 204 in a closed position, where the lower surface of flapper 204 may fully rest against the top surface of the float 206. In its closed position, the flapper 204 may cover the fluid passage (not visible in the figures) running inside the body of the float 206, disabling fluid communication from the fuel tank through the float 206 to the volume above the float 206 within the housing 202. For instance, while the approximate vapor path (shown in FIG. 3) is available for fuel vapor release via the clearance between the float 206 and the housing 202 under normal operation, an additional passage also exists through a cavity or passageway (not visible in the figures) within the body of the float 206 that can permit fuel vapor passage past the flapper 204 when the flapper 204 is open. This additional passageway through the body of the float 206 is normally held closed at the upper surface of the float 206 by means of the flapper 204 in its closed state.

In particular embodiments, the flapper 204 may be configured to be openable. As an example and not by way of limitation, the flapper 204 can open by lifting and/or tilting relative to the upper surface of the float 206. In particular embodiments, the flapper 204 may connected to the float 206 by means of a flapper guide 702 located at the upper surface of the float 206 that permits the flapper 204 to lift and/or tilt relative to the float 206. In some embodiments, the flapper guide 702 may additionally restrict the extent of maximum possible lift and/or maximum possible tilt of the flapper 204 relative to the float 206.

In particular embodiments, the flapper 204 may have a relatively rigid frame 704, which may be connected to the flapper guide 702, and a baffle 706 that arches over the frame 704. As an example and not by way of limitation, the baffle 706 may include a ribbon surface made of flexible and/or deformable material such as elastomer as explained above such that the baffle 706 may be capable of sustaining a large number of deformation cycles without substantial failure of material or operational intent. Provided in this way, as the float 206 translates to its uppermost position (e.g., due to a rise in liquid fuel level) into engagement with the orifice 304, the baffle 706 may compress to seal off against the entrance of the orifice 304, offering a high degree of leakage protection.

Figure 9:
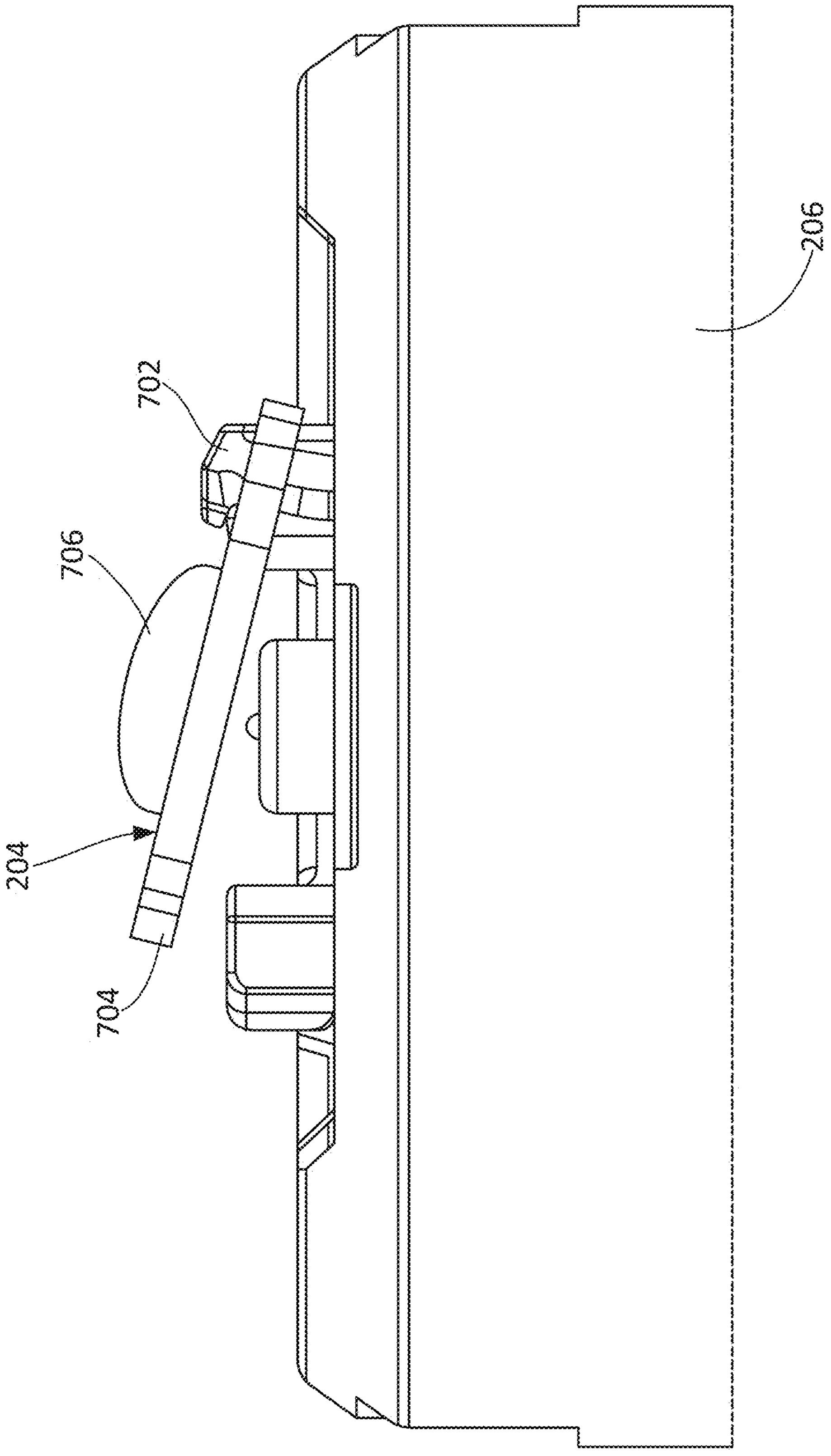
FIG. 9 depicts the flapper of FIG. 7 in an open position.

FIG. 9 shows the flapper 204 in an open position, where the flapper 204 is seen to have lifted (i.e., moved upward relative to the upper surface of the float 206) and tilted (i.e., rotated relative to the upper surface of the float 206, where the rotation of tilting is seen clockwise in the example frame of reference in this figure.) Although depicted as being lifted and tilted to a particular degree of opening, it should be understood that this disclosure is not so limited. Other suitable open positions of the flapper are also envisioned by this disclosure for achieving the desired functions.

In particular embodiments, following an event where the float 206 and flapper 204 have risen to the uppermost float position in order to seal the vapor release passage through the orifice 304 based on a high level of liquid fuel, the fuel level may subsequently drop, such as due to fuel use for operating the vehicle. The float 206 in this situation is needed to track the now-falling level of liquid fuel and translate downward (i.e., along the y-axis), thereby uncovering the vapor release passage and restoring the ability to release unwanted fuel vapors. However, in the absence of a specific feature to address this, the float 206 may not readily withdraw downward based on a drop in fuel level. This difficulty in the potential downward motion of the float 206 would occur because the instantaneous fluid pressure in the volume located above the float 206 would tend to reduce based on volume enlargement, and the reduction in pressure above the float 206 would prevent the float 206 from moving down based on the relative pressures across (i.e., above and below) the float 206. In such a situation, the flapper 204 is designed to open and equalize the pressure above and below the float 206, permitting the float 206 to translate downward in tandem with the liquid fuel level drop, thereby uncovering the orifice of the orifice 304 and the vapor release passage.

Figure 10:
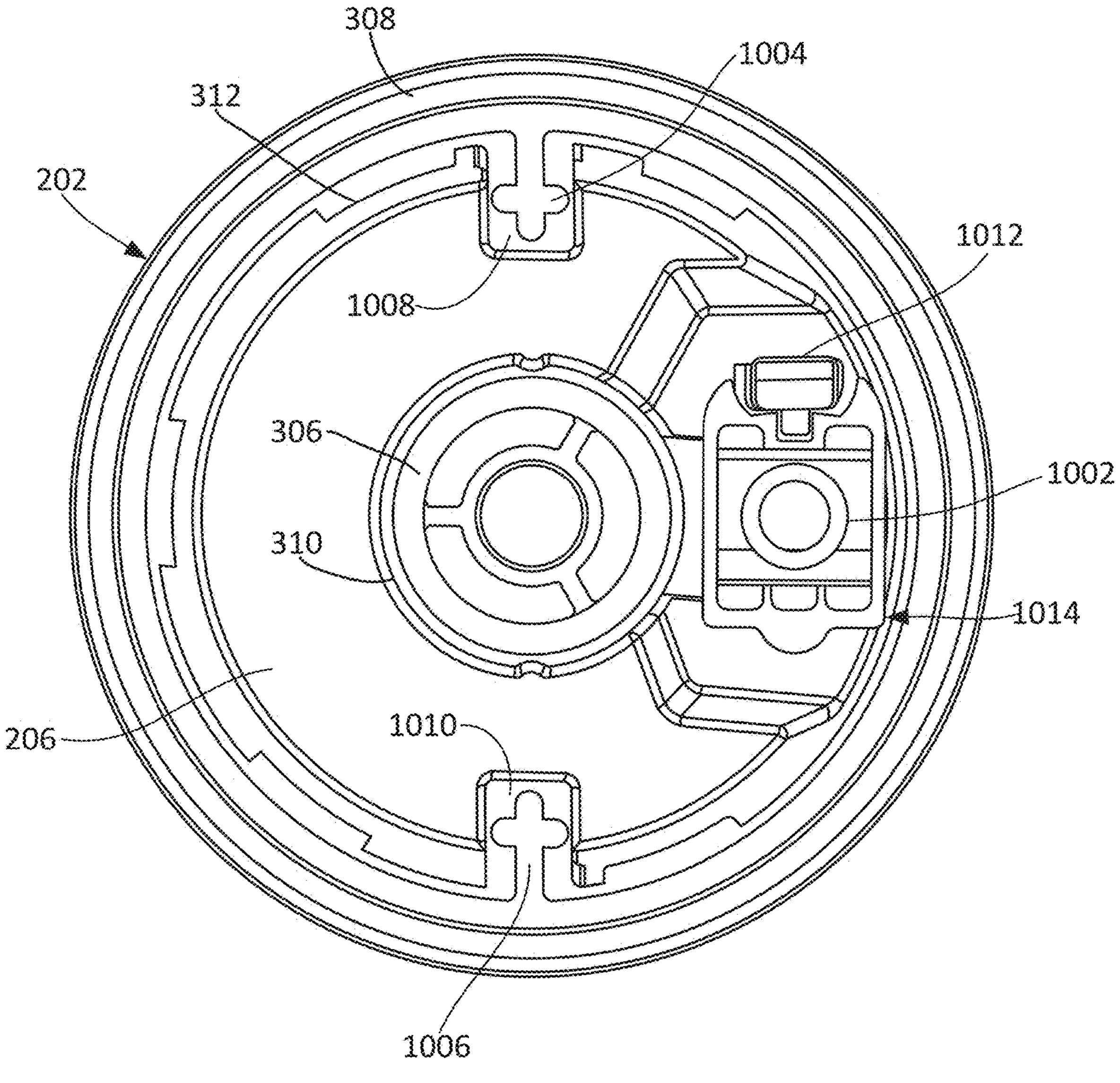
FIG. 10 depicts some example embodiments of particular alignment features as well as a flapper and a flapper guide.

FIG. 10 shows an example arrangement of the housing 202, the flapper 1014, and the float 206. In particular embodiments, it may be desirable to reduce any leakage of liquid fuel through the vapor release passage to the greatest extent possible. For high sealing performance, it may be desirable for the flapper 1014 to align correctly and closely with the orifice of the orifice 304 when the float 206 moves to its topmost position. Misalignments in terms of relative translations (e.g., laterally or transversely with respect to the y-axis), offsets, and/or tilts of position may adversely affect sealing performance. As an example, deviations of the float 206 (and therefore flapper 1014) may occur subject to multiple aspects of operating conditions, external forces or perturbations acting on the float 206. For instance, referring bake to the side view of the assembly as seen in at least FIGS. 3-6, when the vehicle is located on an inclined surface, buoyant forces acting to raise the float 206 against the direction of gravity are not parallel with the y-directed available path of translation for the float 206. As a result, along with the translating component of the resultant force, a turning or tilting moment will act on the float 206, tending to displace relative positions of sealing features such as the flapper 1014 on the float 206 relative to the valve orifice 304 on the housing 202. Similarly, when the vehicle experiences aggressive motion such as acceleration or rapid turning, significant fluid motion such as sloshing or swirling may act on the float 206 as well as other float components to displace them from their aligned position relative to the valve orifice 304.

As such, to assist in aligning or centering the float 206 relative to the housing 202 and prevent undesired shifts in their positions, alignment and/or guiding features may be provided, which may guide the movement of the float 206 as it translates inside the housing 202. In this way, the correct positioning of the flapper 1014 relative to the valve orifice 304—which is shown by a schematic ring 1002—may be guaranteed, thus reducing the likelihood of fluid leakage especially due to misalignment.

While the embodiments disclosed herein may be described using the term alignment feature, other terminology that is suitable for guiding movement or aligning position may be used interchangeably, for example, guiding feature.

In some embodiments, one or more float guides 1004, 1006 may be provided in the housing 202. As an example and not by way of limitation, the float guide 1004, 1006 may be arranged at the outer wall 308 of the housing 202 and extend inwardly towards the float 206. Correspondingly, one or more float guide channels 1008, 1010 may be structured at the outer surface 312 of the float 206 and configured to engage with the float guide 1004, 1006 of the housing 202. In such a design, however, the effect of fluid dynamics and/or forces acting on the float 206, such as swirling fluid motion, may be amplified due to the relatively large cross-sectional areas of the channels 1008, 1010 receiving fluid flow, and/or due to the outer radial locations of the channels

1008, 1010 that adversely provide large moment lengths for the resultant forces on the float 206.

Figure 11:
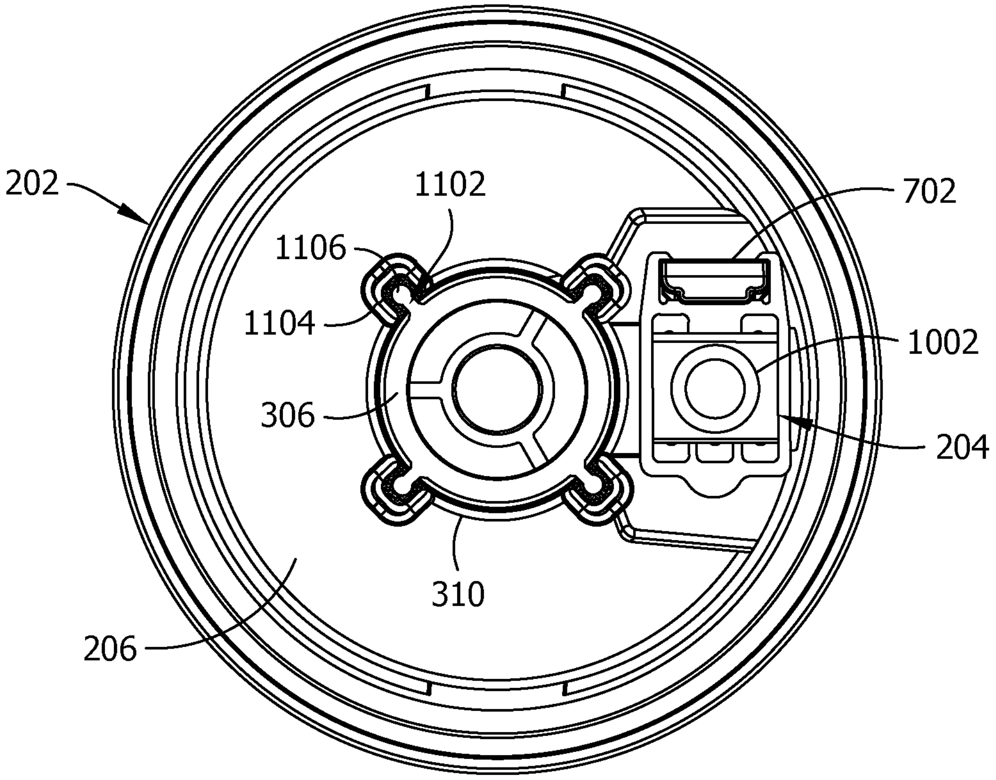
FIGS. 11-12 depict one configuration of the alignment features according to this disclosure.
Figure 12:
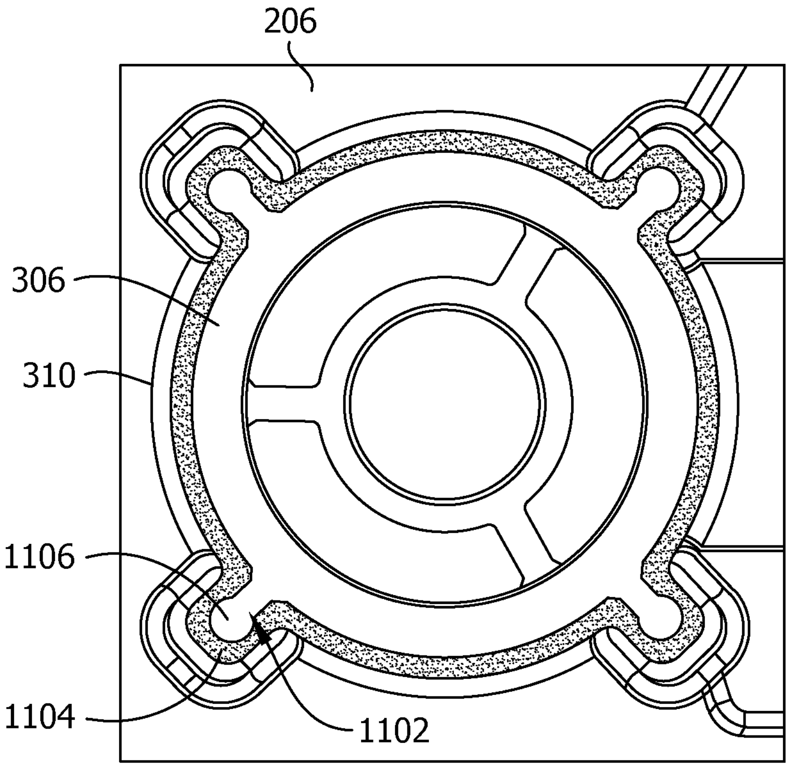

FIGS. 11-12 show another embodiment of the float 206 and the housing 202, both of which may include one or more alignment features similar to the ones described above. In particular embodiments, one or more float guides 1102 may be disposed at the inner wall 306 of the housing 202 and point outward to the float 206. As an example and not by way of limitation, in the configuration as depicted, four float guides 1102 may be provided, which may be uniformly arranged in the radial direction on the inner wall 306 of the housing 202 at an equal spacing from each other. Correspondingly, the float 206 may also be configured with one or more (e.g., four as shown) float guide channels 1104 at the inner surface 310 of the float 206, which may be positioned radially at an equal distance from each other and configured to mate with the float guides 1102 of the housing 202. As further depicted, in particular embodiments, the float guide 1102 may optionally be structured with a nob or round protrusion 1106, for example, at the tip portion of the float guide 1102. This may be more clearly observed in FIG. 12, where the float guides 1102 and the float guide channels 1104 are enlarged to better show the details. When extending into the float guide channel 1104, the nob 1106 may touch the float guide channel 1104 or at least reduce the clearance between the float guide 1102 and the float guide channel 1104 so as to further limit the freedom of lateral movement of the float 206 relative to the housing 202. Of course, the nob 1106 may be shaped differently than shown without departing from the scope of this disclosure.

While described in this particular way, it may be appreciated by a skilled person in the art that other suitable numbers (such as two, three, five, six, and so forth) and arrangements of the alignment features (e.g., the float guide and the float guide channel) are also possible for performing the desired function of this disclosure. For example, in some embodiments, the number of float guides may be increased, permitting tighter alignment due to a more uniform and distributed constraining action of the float guides on the float, restricting unwanted displacements and motion during the intended longitudinal translation of the float. Moreover, a greater number of the float guide channels may enable smaller cross-sectional areas required for movement guidance and constraining. These smaller cross-sectional areas may reduce the surface area within the float available and presented to fluid motion. Also, the locations of the float guide channels at the inner radius of the float may reduce the moment lengths available for action of fluid forces that impinge on the float. Such restricted relative displacements, forces and motion of the float may further contribute to improving alignment of the flapper with the valve orifice, thereby reducing fuel leakage and improving sealing capability.

Figure 13:
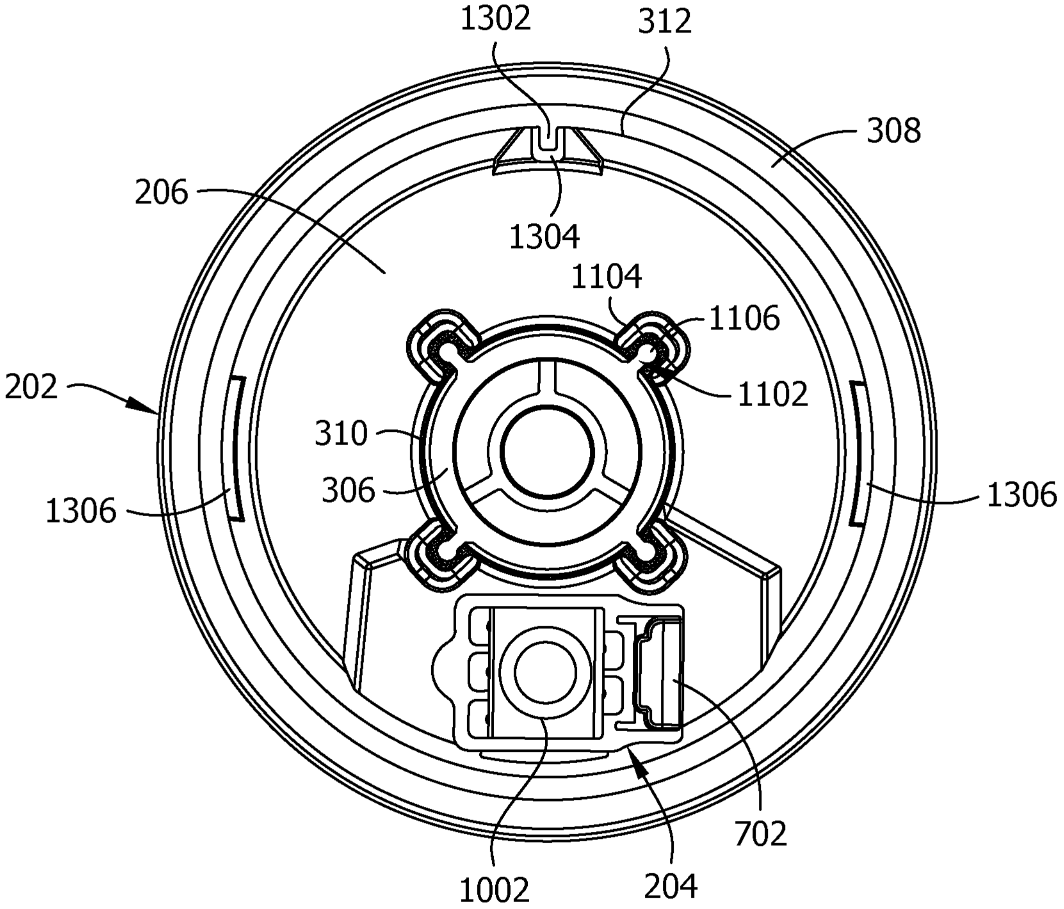
FIG. 13 depicts another configuration of the alignment features according to this disclosure.

FIG. 13 illustrates yet another embodiment of the alignment features of the float 206 and the housing 202. This configuration may be similar to the ones described above with reference to FIGS. 11-12 in that four sets of float guide and float guide channel may be provided respectively on the inner wall 306 of the housing 202 and the inner surface 310 of the float 206 along the radial direction. In addition, one or more additional float guide 1302 may be configured at the outer wall 308 of the housing 202. The outer surface 312 of the float 206 may also be structured with one or more additional float guide channels 1304 to receive the associated float guides 1302 therein. As an example and not by way of limitation, the additional float guide 1302 and float guide channels 1304 may have reduced cross-sectional areas in order to minimize the hydraulic force acting on the float 206. In particular embodiments, the outer periphery or surface 312 of the float 206 may further be slotted with one or more vapor relief cutouts 1306, which may help optimize the flow of fuel vapors past the clearance between the float 206 and the housing 202. Again, while described and depicted in this particular manner, a person of skill in the art should understand that other suitable configurations of the float and the housing may be employed. For example, the numbers of the additional float guide, float guide channels, and the vapor relief cutout may be provided differently than as shown without departing from the scope of this disclosure.

Figure 14:
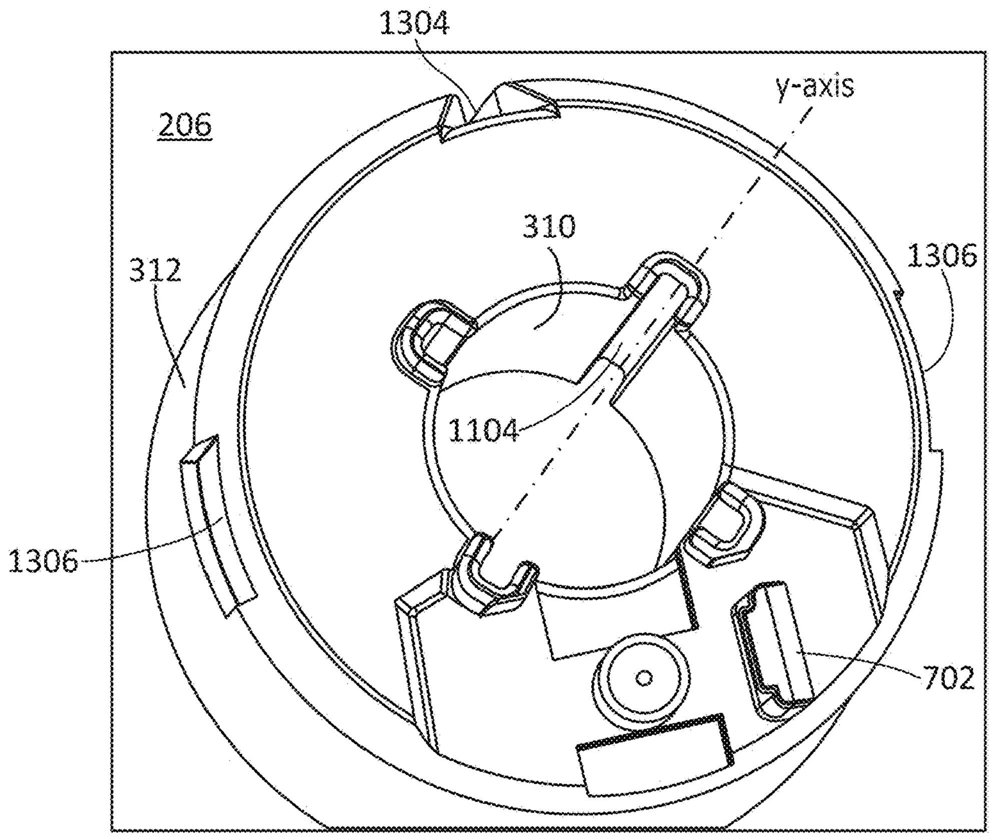
FIGS. 14-15 depict the alignment features on the float and the housing, respectively, according to this disclosure.

FIG. 14 shows the standalone view of the float 206 (with the flapper 204 omitted) from another perspective, in which the alignment features (i.e., the float guide channels 1104, the additional float guide channel 1304) as well as the vapor relief cutout 1306 may be more clearly observed. As seen, the float guide channels 1104 may have a significant longitudinal length along the y-axis height of the float 206, i.e., pointing into the page shown in the figures. Similarly, while not visible from this perspective, the additional float guide channel 1304 may also span through the entire height of the float 206 in the y-axis. In particular embodiments, the vapor relief cutout 1306 on the other hand may have a length that is much smaller than the height of the float 206, e.g., to facilitate the escape of vapor while limiting the hydraulic force impinging on the float 206 to a small extent.

Figure 15:
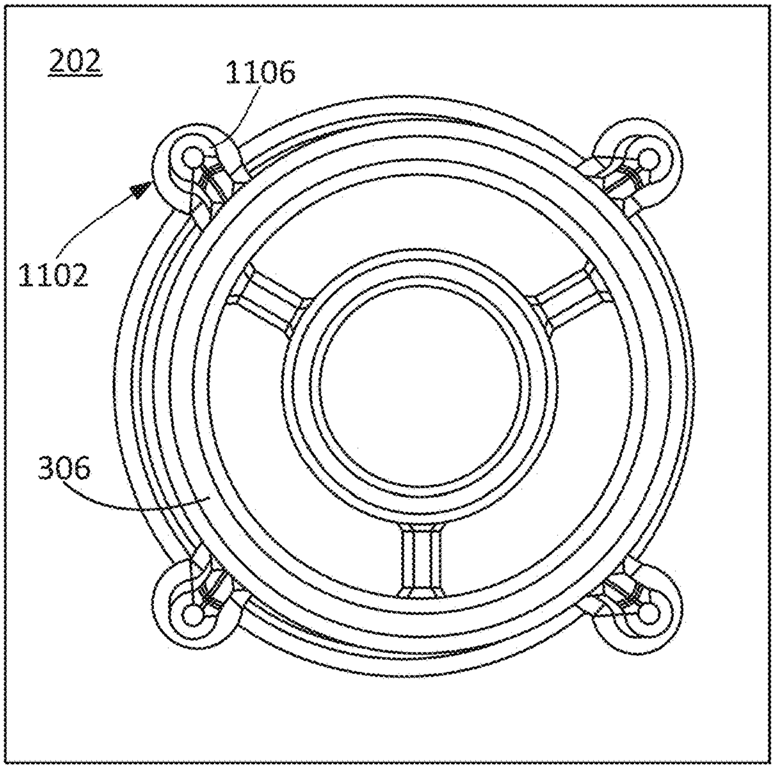

Similarly, FIG. 15 shows the float guides 1102 of the housing 202 from a different viewing angle. In particular embodiments, the float guide 1102 may have a length that is substantially equal to the length of the float guide channel 1104 such that when inserted, the float guide 1102 may extend throughout the float guide channel 1104 (e.g., along the y-axis). This, for example, may offer better guidance and constraints on the movement of the float 206 and prevent misalignment of the float 206 as well as its various components (such as the flapper 204) as they translate up and down inside the housing 202 responsive to the changes in liquid fuel level.

The above dimensions and configurations of the alignment features and/or other features (such as the vapor relief cutout) are provided merely as an example and not intended to limit the scope of this disclosure. Other suitable dimensions and configurations are also contemplated by this disclosure for performing the desired functions.

As already explained above, misalignments of the float relative to the housing—more specifically of the flapper relative to the valve orifice—may affect sealing performance, causing undesired fluid leakage. In particular embodiments, as previously discussed with reference to FIGS. 7-8, the flapper 204 may be connected to the float 206 by means of the flapper guide 702 disposed at the top surface of the float 206. As an example and not by way of limitation, the flapper guide 702 may permit the flapper 204 to lift and/or tilt relative to the top surface of the float 206. As another example, the flapper guide 702 may additionally restrict the extent of maximum possible lift and/or maximum possible tilt of the flapper 204 relative to the float 206.

FIGS. 16-22 show several embodiments of various flapper and flapper guide combinations. Undesirable deviations of flapper position in the form of relative translations, offsets, and/or tilts (e.g., in a lateral direction) may occur due to unintended relative motion between the flapper and the float. For example, since the flapper is allowed to be lifted open, e.g., for balancing pressure across the float, the flapper sometimes may not return to its proper relative position and alignment with the valve orifice as it lands back, which for example may be the result of poor engagement between the flapper and the flapper guide.

Figure 16:
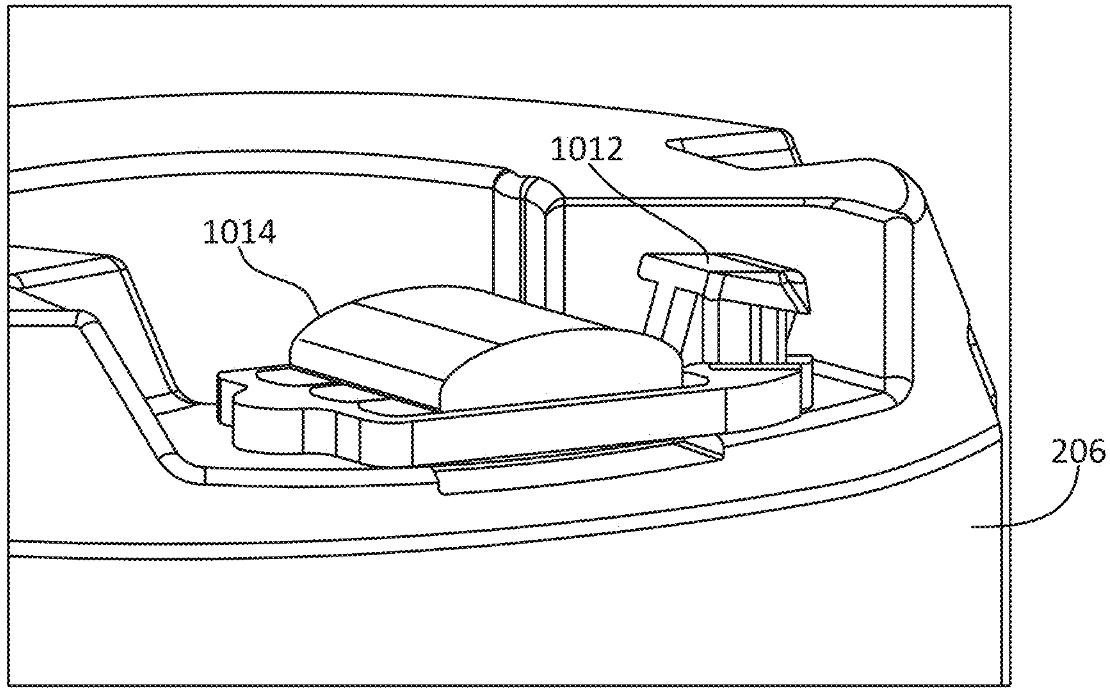
FIG. 16 depicts the flapper and the flapper guide of FIG. 10 from another angle.

For instance, in the embodiments such as shown in FIG. 16 (as well as FIG. 10), the cross section of the flapper guide 1012 may narrow or taper toward the side of the flapper guide 1012 facing the flapper 1014 (as would be more clearly seen in the top view of FIG. 10.) In such a tapering configuration, it may be possible for the flapper 1014 to experience excessive displacement or motion relative to the flapper guide 1012, for instance, as a twisting or rotational tendency about the flapper guide 1012, e.g., as would be seen in the top view, about an axis parallel to the longitudinal direction of the float 206.

Figure 17:
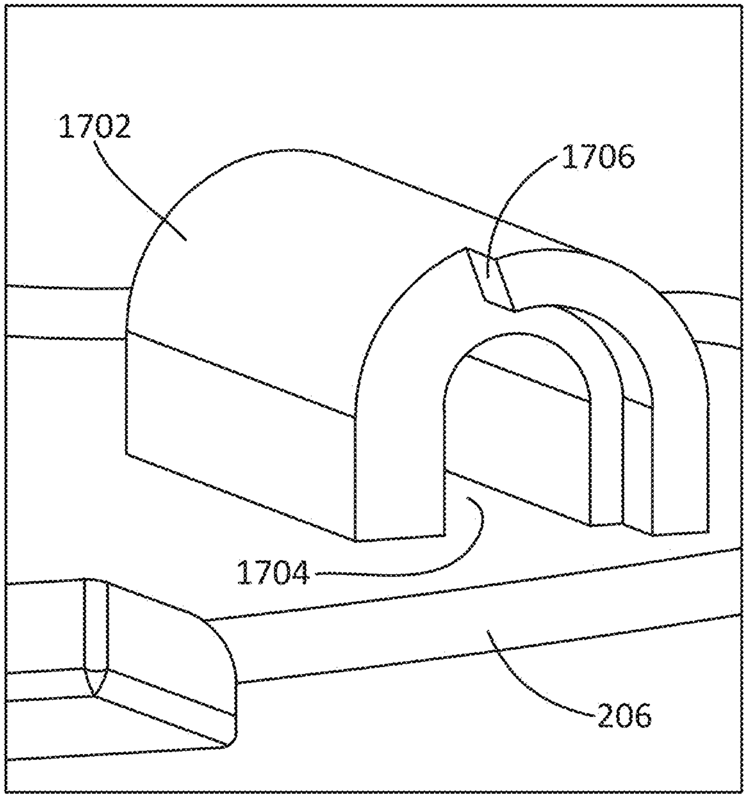
FIGS. 17-18 depict one configuration of the flapper and the flapper guide according to this disclosure.
Figure 18:
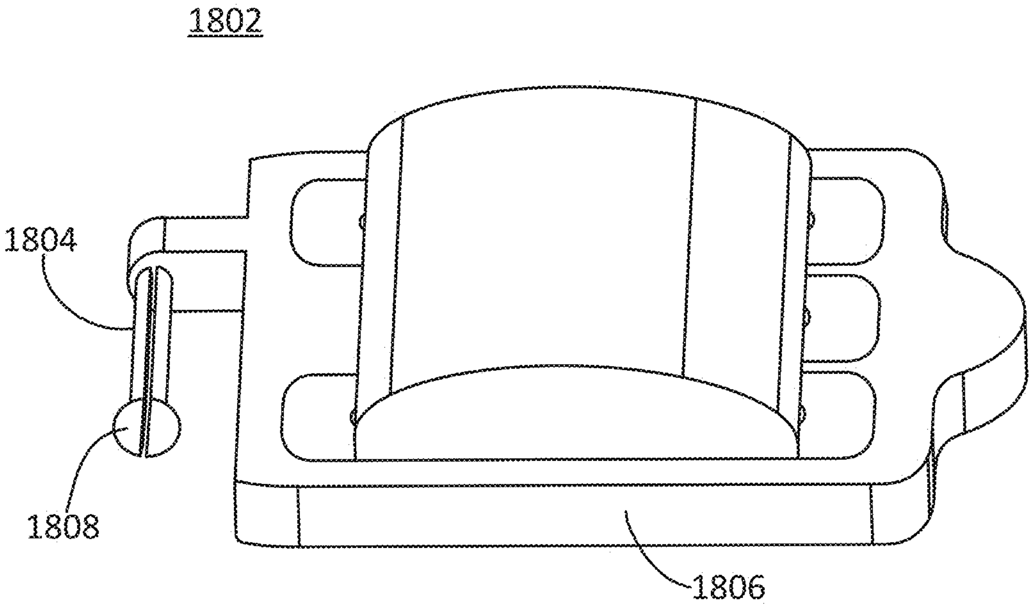

FIGS. 17-18 respectively show a first configuration of the flapper guide 1702 and the flapper 1802 according to this disclosure. In particular embodiments, the flapper guide 1702 may take form as a hinge, which for example, may be permanently connected at both ends thereof to the upper surface of the float 206 and form a channel 1704. In particular embodiments, the flapper 1802 may include a post 1804. As an example and not by way of limitation, one end of the post 1804 may be connected to a base frame 1806 of the flapper 1802 in a cantilevered manner such that during operation, the flapper 1802 may rotate about the post 1804. The other end of the post 1804 may be structured with an enlarged nob 1808. In particular embodiments, the post 1804 may be split along its length. Configured in this way, for example, the post 1804 may be briefly compressed for assembly and inserted through the channel 1704 of the flapper guide 1702.

Whereupon release, the post 1804 may hold the flapper 1802 in position relative to the flapper guide 1702 by means of its enlarged nob 1808, while permitting opening and/or closing of the flapper 1802 and restricting its lateral movement. Additionally, in particular embodiments, one or both sides of the flapper guides 1702 may be notched, forming a stopper 1706 so as to limit the degree of opening of the flapper 1802 to a desired level, thus avoiding over-rotation of the flapper 1802.

Figure 19:
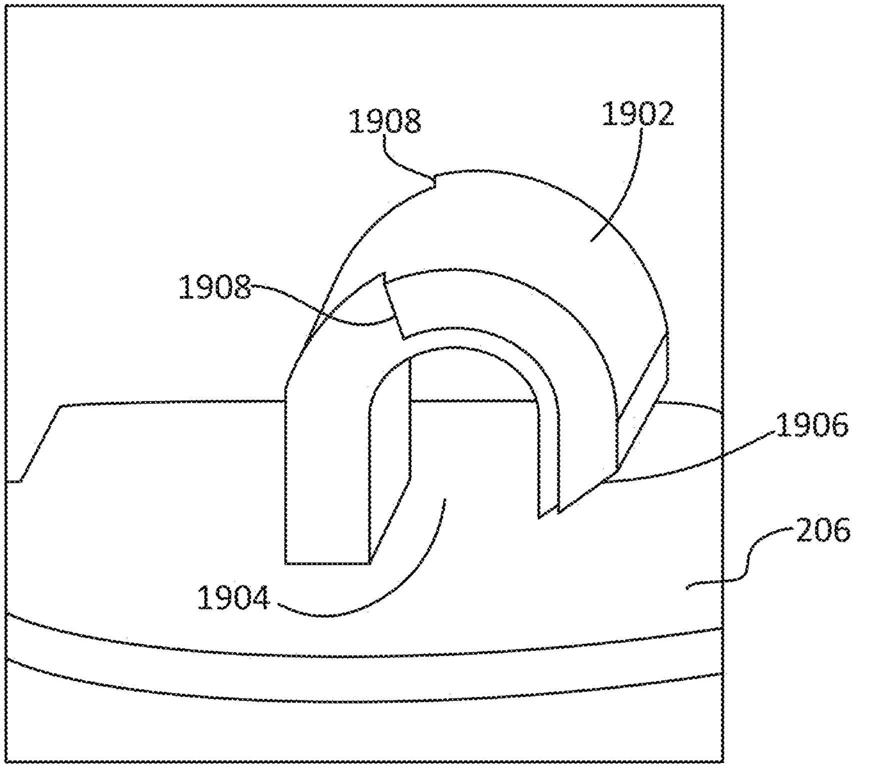
FIGS. 19-20 depict another configuration of the flapper and the flapper guide according to this disclosure.
Figure 20:
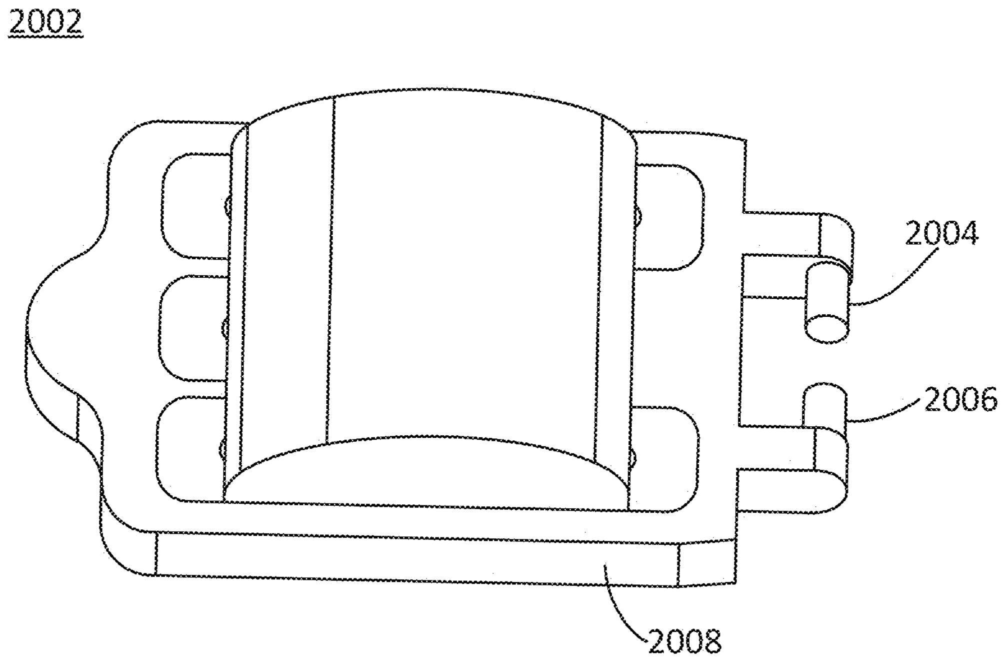

FIGS. 19-20 respectively show a second configuration of the flapper guide 1902 and the flapper 2002 according to this disclosure. In particular embodiments, the flapper guide 1902 may take form as a hinge, which for example, may be permanently connected at one end thereof to the upper surface of the float 206, with the other (free) end 1906 located in close proximity to the upper surface of the float 206 without any rigid connection thereto. In particular embodiments, the flapper guide 1702 may form a channel 1904 therethrough, which may be similar to the channel described above for engaging with the flapper 2002. In particular embodiments, the flapper 2002 may include one or more posts, e.g., posts 2004, 2006, which may be connected to a base frame 2008 of the flapper 2002. As an example and not by way of limitation, the respective ends of the posts 2004, 2006 may be spaced from one another by a small distance. As such, the posts 2004, 2006 may be briefly spread apart under component stress for assembly of the flapper 2002 with the flapper guide 1902 and then released back to their original position as they enter into the channel 1904 to hold the flapper 2002 in place, while permitting opening and/or closing of the flapper 2002 and restricting its lateral movement. Alternatively, although not shown, a single post may be provided, which during assembly may be snapped into the channel 1904 through the clearance between the free end 1906 and the top surface of the float 206 in order to secure the flapper 2002 to the flapper guide 1902 in a rotatable manner. Similarly, in particular embodiments, one or both sides of the flapper guides 1902 may be notched, forming a stopper 1908 so as to limit the degree of opening of the flapper 2002 to a desired level, preventing the flapper 2002 from further opening beyond the stopper 1908.

Figure 21:
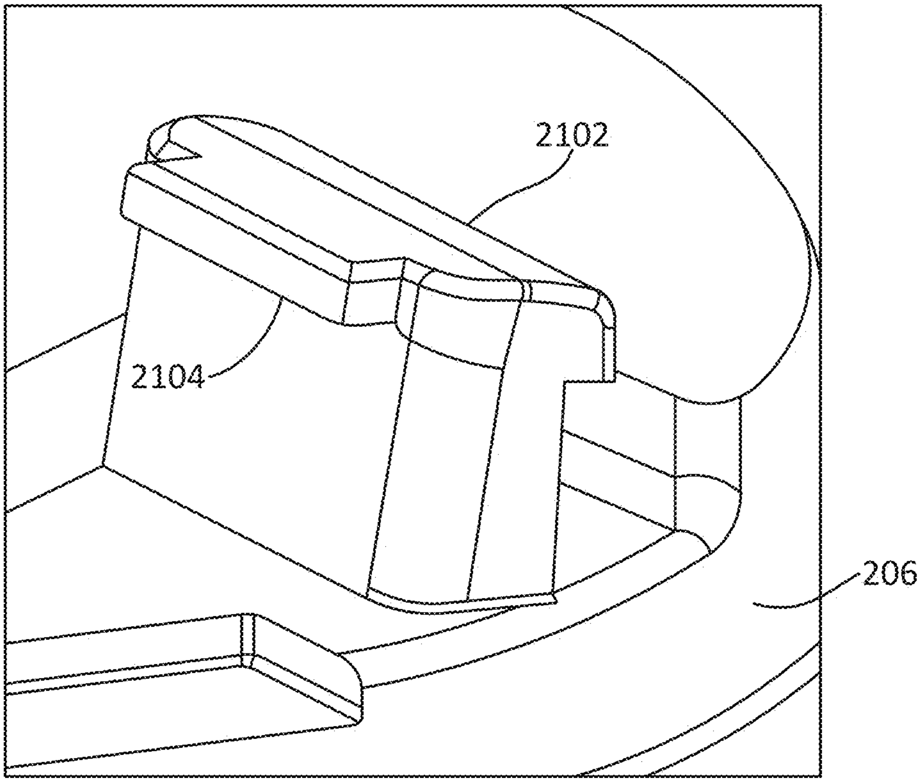
FIGS. 21-22 depict a further configuration of the flapper and the flapper guide according to this disclosure.
Figure 22:
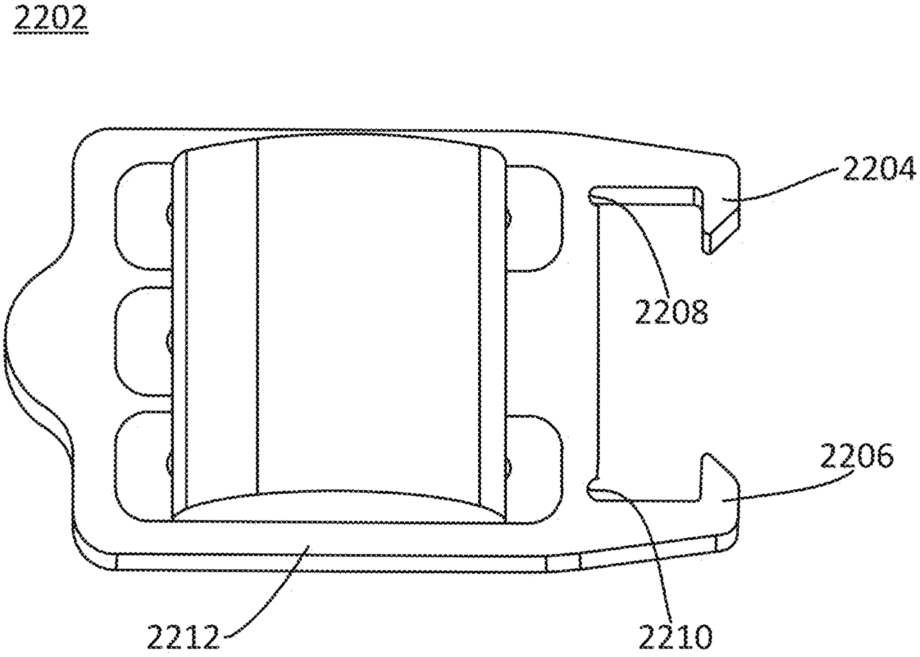

FIGS. 21-22 respectively show a third configuration of the flapper guide 2102 and the flapper 2202 according to this disclosure. In particular embodiments, the flapper guide 2102 may be formed as a rib protruding outward from the top surface of the float 206. For example, the flapper guide 2102 may have a wide cross section, e.g., at a base portion thereof. As an example and not by way of limitation, the cross section of the flapper guide 2102 may be shaped generally as a tetragon, rectangle, rounded rectangle, or the like. The large and broadly distributed cross-sectional area of the rib-like flapper guide 2102 may provide the benefits of significantly constraining the flapper 2202 from lateral displacement and/or rotation, for example, relative to the valve orifice of the housing. Furthermore, the restricted displacement and accurate alignment relative to the valve orifice may consequently contribute toward reducing fuel leakage, improving sealing and flapper reopening capabilities. In particular embodiments, the flapper guide 2102 may be configured with a notch 2104 near its top so as to permit lift and/or tilt of the flapper 2202 relative to the upper surface of the float 206, while restricting the maximum possible extent of motion of the flapper 2202 as it lifts and/or tilts. In particular embodiments, the flapper 2202 may include connector ends 2204, 2206 that extend from a frame 2212 and engage with the flapper guide 2102, e.g., by fitting or snapping onto the base of the flapper guide 2102. As a non-limiting example, the connector ends 2204, 2206 may be briefly spread apart under component stress for assembly of the flapper 2202 with the flapper guide 2102 and then released to substantially return to their original position and hold the flapper 2202 in place, while permitting opening and/or closing of the flapper 2202. Additionally, in particular embodiments, relief cutouts 2208, 2210 may be provided at the base of the connector ends 2204, 2206, respectively. For example, the relief cutouts 2208, 2210 may reduce the stress imparted to the material when the connector ends 2204, 2206 are temporarily separated for assembly, which may reduce permanent deformation of the flapper 2202 and therefore improve alignment performance of the flapper 2202, e.g., relative to the valve orifice of the housing, as well as overall component durability and reliability over operational life. Furthermore, with restricted displacement and precise alignment, the features of this disclosure may additionally contribute toward reducing fuel leakage, and improving sealing and reopening capabilities of the flapper.

Figure 23:
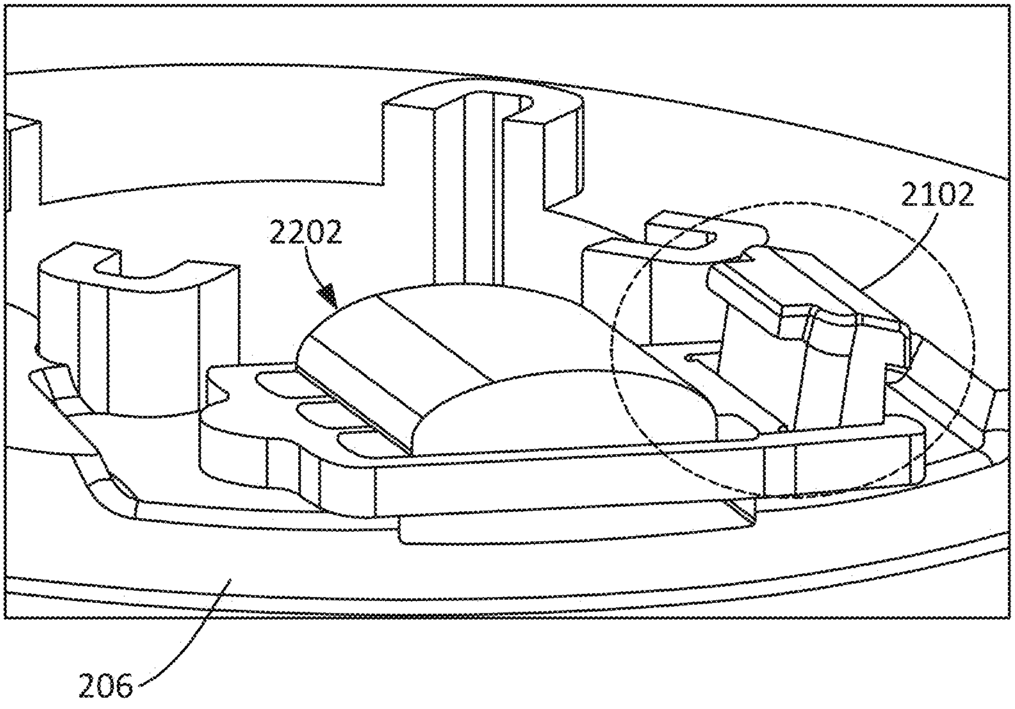
FIGS. 23-25 depict the flapper and the flapper guide of FIGS. 21-22 from different perspectives.

FIG. 23 shows the flapper 2202 and the flapper guide 2102 in the assembled configuration, where the flapper 2202 is shown in its close state. As already explained, when closed, the flapper 2202 may well rest on top of the upper surface of the float 206 and cover a fluid passage (not visible in the figures) running inside the body of the float 206, disabling fluid communication through the float 206 to the volume above the float 206 within the housing.

Figure 24:
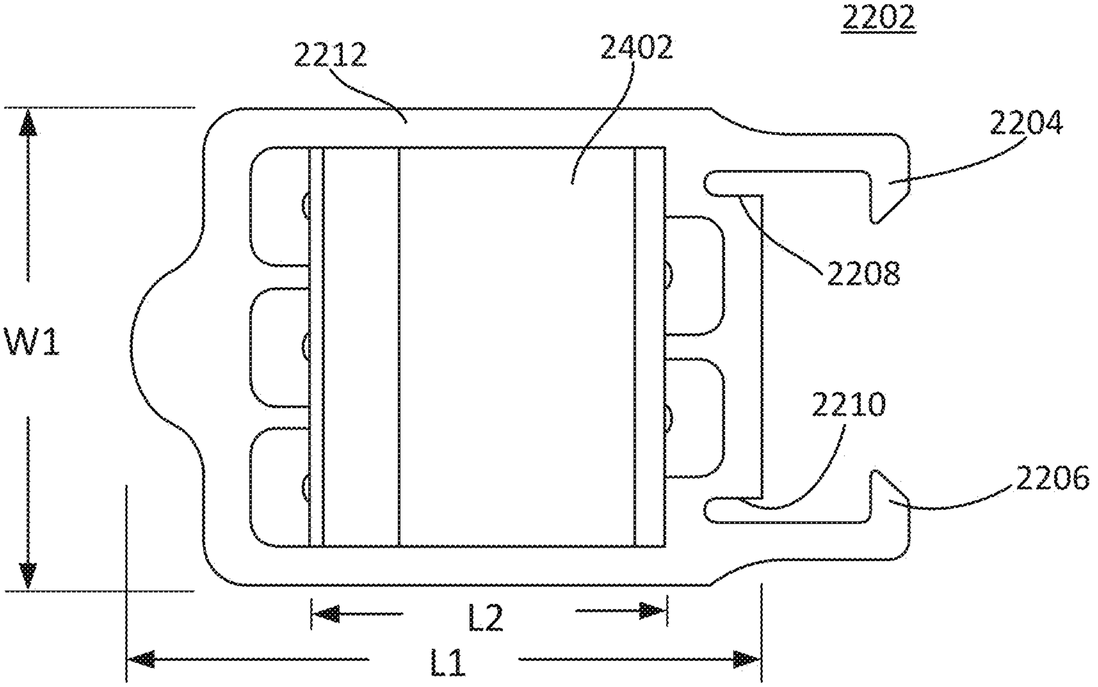
Figure 25:
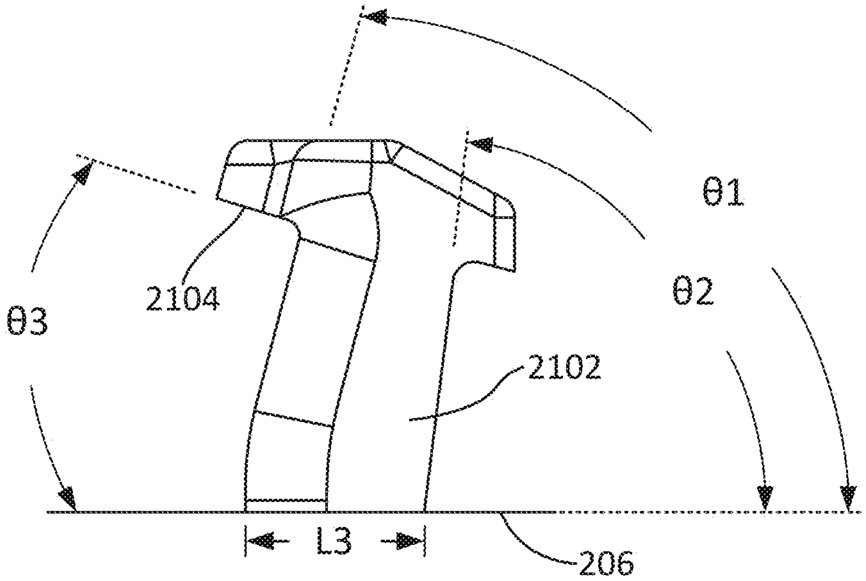

In addition, for the purpose of explanation only, FIGS. 24-25 illustrate some example dimensions of the flapper 2202 and the flapper guide 2102. In particular embodiments, the frame 2212 of the flapper 2202, which for example may be made of relatively rigid material, may generally be dimensioned with a length $L_1$ of about 13.17 mm and a width $W_1$ of about 10.00 mm. In particular embodiments, a deformable baffle 2402 that arches over the frame 2212 may generally have a length $L_2$ of about 7.39 mm. In particular embodiments, the flapper guide 2102 may be inclined relative to the top surface of the float 206. As an example and not by way of limitation, the front side of the flapper guide 2102 (i.e., the side facing a substantial portion of the flapper 2202) may be inclined at an angle $\theta_1$ of about 76.7 degrees, whereas the back side of the flapper guide 2102 (i.e., the side engaging with the connector ends 2204, 2206) may be inclined at an angle $\theta_2$ of about 82.5 degrees. In particular embodiments, the notch 2104 may be slanted relative to the top surface of the float 206, e.g., at an angle $\theta_3$ of about 13 degrees. In particular embodiments, the base portion of the flapper guide 2102 may have a length $L_3$ of about 1.81 mm.

It will be appreciated by one of skill in the art that the above dimensions are provided for the purpose of explanation only and not necessarily a requirement. Although this disclosure describes the flapper and the flapper guide as having particular dimensions in a particular manner, this disclosure contemplates the flapper and the flapper guide as having any suitable dimensions in any suitable manner. Moreover, this disclosure contemplates not only the combination of features as set out in the above and depicted in the figures but also any other suitable combination of features. For example, the flapper 1802 described with reference to FIG. 18 may be applicable to the flapper guide 1902 described with reference to FIG. 19. As another example, the flapper 2002 described with reference to FIG. 20 may be applicable to the flapper guide 1702 described with reference to FIG. 17. In addition, the embodiments disclosed herein are only examples, and the scope of this disclosure is not limited to them. Particular embodiments may include all, some, or none of the components, elements, features, functions, or operations of the embodiments disclosed above.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A vent valve assembly for use with a fuel tank, comprising:

a housing having an outer wall structure and an inner wall structure, the outer wall structure and the inner wall structure defining a chamber therebetween;

a float located inside the chamber and configured to be translatable relative to the housing along an axis, the float having an orifice extending along the axis, wherein the inner wall structure of the housing is disposed within the orifice of the float, and wherein an inner surface of the orifice of the float is positioned to face the inner wall structure of the housing;

one or more guiding features located on the inner surface of the orifice of the float; and one or more mating guiding features located on the inner wall structure of the housing and configured to mate with the one or more guiding features;

wherein the one or more guiding features and the one or more mating guiding features cooperate to guide translation of the float relative to the housing along the axis and restrict rotation of the float about the axis.

2. The vent valve assembly of claim 1, wherein the one or more guiding features extend substantially throughout the length of the float along the axis.

3. The vent valve assembly of claim 1, wherein the length of the one or more guiding features is substantially equal to the length of the one or more mating guiding features.

4. The vent valve assembly of claim 1, wherein the one or more guiding features are configured as guide channels.

5. The vent valve assembly of claim 4, wherein the one or more mating guiding features are configured as guides that are inserted into the guide channels.

6. The vent valve assembly of claim 1, wherein the one or more guiding features are uniformly distributed in a radial direction on the inner surface of the orifice of the float.

7. The vent valve assembly of claim 1, wherein the one or more mating guiding features are uniformly distributed in a radial direction on the inner wall structure of the housing.

8. The vent valve assembly of claim 1, wherein the one or more mating guiding features include a nob.

9. The vent valve assembly of claim 1, wherein four guiding features and four mating guiding features are provided.

10. The vent valve assembly of claim 1, further comprising:

one or more additional guiding features located on an outer surface of the float; and one or more additional mating guiding features located on the outer wall structure of the housing and configured to mate with the one or more additional guiding features.

11. A vent valve assembly, comprising:

a housing having an outer wall structure, an inner wall structure, and a valve orifice, the outer wall structure and the inner wall structure defining a chamber therebetween;

a float located inside the chamber and configured to be translatable relative to the housing along an axis, the float having an orifice extending along the axis, wherein the inner wall structure of the housing is disposed within the orifice of the float, and wherein an inner surface of the orifice of the float is positioned to face the inner wall structure of the housing;

one or more guiding features located on the inner surface of the orifice of the float;

one or more mating features located on the inner wall structure of the housing and configured to mate with the one or more guiding features;

a flapper disposed at an upper surface of the float and positioned in alignment with the valve orifice; and a flapper guide located at the upper surface and configured to engage with the flapper;

wherein the flapper guide allows opening and closing of flapper and keeps the flapper in alignment with the valve orifice, and wherein the orifice of the float is laterally offset from the valve orifice.

12. The vent valve assembly of claim 11, wherein the flapper guide is a hinge having two ends respectively connected to the upper surface of the float.

13. The vent valve assembly of claim 11, wherein the flapper guide is a hinge having one end connected to the upper surface of the float and another end free from connection to the upper surface of the float.

14. The vent valve assembly of claim 11, wherein the flapper guide comprises a channel.

15. The vent valve assembly of claim 14, wherein the flapper includes one or more posts, which are inserted into the channel of the flapper guide in a rotatable manner.

16. The vent valve assembly of claim 11, wherein the flapper guide comprises a stopper configured to limit the degree of opening of the flapper.

17. The vent valve assembly of claim 11, wherein the flapper guide is a rib.

18. The vent valve assembly of claim 11, wherein the flapper guide comprises a base having a large cross-sectional area so as to restrict lateral movement of the flapper.

19. The vent valve assembly of claim 18, wherein the cross-sectional area of the base is shaped as a tetragon.

20. The vent valve assembly of claim 11, wherein the flapper comprises one or more connector ends.

* * * * *